June 26, 1962 W. H. BERCH ETAL 3,041,399

TOLL TICKETING SYSTEM

Filed May 1, 1958 12 Sheets-Sheet 1

INVENTORS.
WILLIAM H. BERCH
RICHARD P. BOYER, Jr.
ERNEST H. GATZERT

BY Francis E. Blake

ATTORNEY

June 26, 1962 W. H. BERCH ETAL 3,041,399

TOLL TICKETING SYSTEM

Filed May 1, 1958 12 Sheets-Sheet 3

June 26, 1962 W. H. BERCH ETAL 3,041,399

TOLL TICKETING SYSTEM

Filed May 1, 1958 12 Sheets-Sheet 4

June 26, 1962 W. H. BERCH ET AL 3,041,399

TOLL TICKETING SYSTEM

Filed May 1, 1958 12 Sheets-Sheet 6

EMERGENCY SCANNER -128

June 26, 1962 W. H. BERCH ET AL 3,041,399

TOLL TICKETING SYSTEM

Filed May 1, 1958 12 Sheets-Sheet 7

June 26, 1962 W. H. BERCH ETAL 3,041,399

TOLL TICKETING SYSTEM

Filed May 1, 1958 12 Sheets-Sheet 9

June 26, 1962 W. H. BERCH ETAL 3,041,399

TOLL TICKETING SYSTEM

Filed May 1, 1958 12 Sheets-Sheet 12

"A" SCANNER-118

CLOCK-CALENDAR SENDER-800

United States Patent Office 3,041,399

Patented June 26, 1962

3,041,399

TOLL TICKETING SYSTEM

William H. Berch, Penfield, and Richard P. Boyer, Jr., and Ernest H. Gatzert, Rochester, N.Y., assignors to General Dynamics Corporation, Rochester, N.Y., a corporation of Delaware Filed May 1, 1958, Ser. No. 732,253
29 Claims. (Cl. 179—7.1)

This invention relates to a toll ticketing system for automatically collecting data pertaining to toll calls and, more particularly, to such a system including new and improved means for providing data representing the date and time of placing a call and the identity of a circuit component used in extending the call.

In the copending application of Ben A. Harris, Serial No. 536, 577, filed September 26, 1955, which application is assigned to the same assignee as the present application, there is disclosed an automatic toll ticketing system in which data pertaining to a toll call is automatically collected and stored in a recorder or register individual to the trunk circuit through which the connection is extended. In this prior system, a clock and calendar circuit is provided including a plurality of stepping switches which are continuously adjusted to settings representing instant date and time. When the date and time of placing a toll call is to be stored in the trunk recorder individual to a seized trunk circuit, the trunk circuit seizes a sender or scanner circuit controlled by the clock and calendar circuit and initiates a sending operation during which a series of discrete pulses representing the values of the digits forming instant date and time are transmitted to and stored in the trunk recorder. Following the completion of the sending operation, the clock and calendar circuit and the scanner or sender circuit controlled thereby, both of which are common to a plurality of trunk circuits, are released to permit their seizure and use by another calling trunk circuit.

This circuit arrangement is not as efficient as would be desirable inasmuch as the seizure of the sender or scanner circuit by a single calling trunk circuit delays the recording of the items of information pertaining to other toll calls until such time as the seized scanner is released by the first calling trunk circuit. It is not feasible to provide a plurality of different clock and calendar circuits in the common equipment which are allotted on an idle or busy basis in view of the cost of these circuits. Further, it is often desirable in evaluating the performance of a system to be able to determine the trunk or adapter circuits through which different toll calls are placed in order to locate those circuit components in which abnormal operating conditions may arise during the automatic collection of the toll call data. However, the identification of the trunk or adapter circuit used in extending the toll calls should be provided without the provision of excessive equipment in order to reduce the cost of the system.

Further, in the system disclosed in the above identified application, the circuit arrangement is such that if the clock and calendar circuit or the scanner circuit fails to provide the necessary date and time information or otherwise encounters an abnormal operating condition, the automatic collection of the toll call data is arrested. When the incomplete call data is played back to the output recorder to provide a permanent record, the inadequacy of the data stored in the trunk recorder provides an unintelligible output record or, in some instances, can completely block the recording of any of the data stored pertaining to the call. Since the date and time of placing a toll call and the identity of the circuit components through which a call is placed are not essential to the production of a useful toll ticket pertaining to a call, it would be desirable to record arbitrary digital data in the trunk recorder in place of the date and time and/or the adapter or trunk circuit data when abnormal operating conditions are encountered so that the remaining information pertaining to the call, such as the designation of the calling and called subscribers and the duration of the connection, can be used in a playback operation to provide a useful record which enables the toll call to be charged to the proper subscriber.

Accordingly, one object of the present invention is to provide a new and improved automatic toll ticketing system.

Another object is to provide a toll ticketing system including new and improved means for supplying and recording date and time information relating to a toll call.

Another object is to provide an automatic toll ticketing system including means for determining and recording the designation of the circuit component through which a toll call is extended.

Another object is to provide an automatic toll ticketing system including common circuit components for automatically providing data representing the date and time of placing a call and the individual designation of a circuit component used in controlling the extension of a call.

A further object is to provide an automatic toll ticketing system in which data pertaining to a call is normally supplied by a plurality of selectively seized signaling means and in which means are provided responsive to an abnormal condition in the signaling means for transmitting signals representing arbitrary information to permit the completion of the collection and recording of data pertaining to the call.

Another object is to provide an automatic toll ticketing system in which signaling means are provided for transmitting identical signals representing date and time to a plurality of registers associated with line extending means and for transmitting different signals to each of the registers representing the individual designations of the circuit components through which the different connections are extended.

Another object of this invention is to provide an automatic toll ticketing system including signaling means for concurrently transmitting different signals to a plurality of registers each representing a different individual designation of a circuit component through which a toll connection is extended.

Another object is to provide an automatic toll ticketing system in which a common clock and calendar indicating means selectively controls the transmission of date and time signals by a plurality of sender means selected in accordance with the group in which a calling adapter or trunk circuit is located.

Many other objects and advantages of the present invention will become apparent from a consideration of the following detailed description when considered in conjunction with the following drawings wherein.

Figures 1, 13:
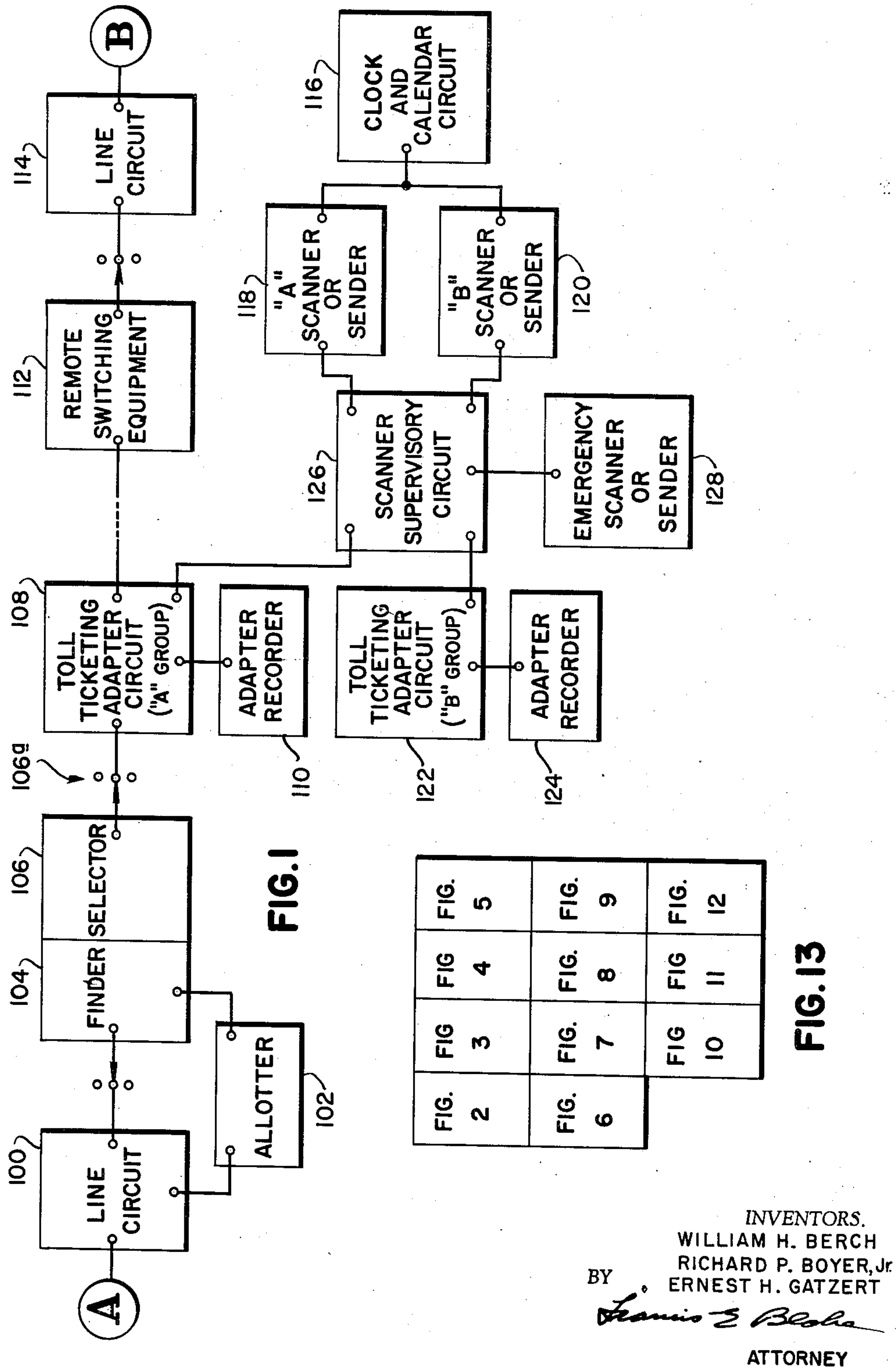
FIG. 1 is a block diagram illustrating the major components of an automatic toll ticketing system embodying the present invention.
FIG. 13 is a block diagram indicating the manner in which FIGS. 2–12 of the drawings are disposed adjacent each other to form a complete circuit diagram.

Referring now more specifically to FIG. 1 of the drawings, therein are shown some of the data collecting and storing components of an automatic toll ticketing system which embodies the present invention and which is of any suitable type such as that described in detail in the above identified copending application. When a ticketed call is to be extended from a substation A to a substation B, going off-hook at the station A actuates a line circuit 100 so that an allotter 102 seizes an idle link, such as one including a finder 104 and a selector 106, and places the finder 104 in operation to search for and seize the calling line circuit 100. Following the seizure of the line circuit 100, the calling loop circuit is cut through to the selector 106 and the subscriber at the station A is advised that the first digit for extending the toll connection is to be dialed. This digit operates the selector 106 and a switch 106*a* forming a part thereof to seize the switch level in which are terminated the trunk or trunk adapter circuits having access to the area in which the called substation B is located. The switch 106*a* then searches over the selected level to seize an idle trunk or adapter circuit, such as an adapter circuit 108 to which is connected an individual adapter or trunk recorder 110. The seizure of the adapter circuit 108 conditions circuits therein for repeating digital information to the recorder 110 for storage therein.

The subscriber A, following the seizure of an idle adapter circuit 108, dials the digits necessary to extend the connection. These digits are concurrently recorded in the recorder 110 and repeated over a trunk to remote switching equipment 112 located either at tandem points or in the called office. The selective operation of the remote switching equipment extends the connection through a line circuit 114 to the called substation B. Accordingly, at the completion of the dialing of the digits necessary to extend the connection to the called substation B, this connection has been established and the digits are stored in the recorder 10. Obviously, if the system is adapted for use with register senders or similar director equipment, the dialed digits can be stored in an intermediate storage unit in which route and rate translating operations are performed and the digits can then be repeated to the recorder 110.

In the event that the called line is idle, answering supervisory signals are received by the adapter circuit 108. The receipt of these signals initiates the recording of additional items of information pertaining to the toll call, such as the identification of the calling substation A, the date and time of placing the call, and the duration of the call. In general, these recording operations are performed as described in detail in the above identified application.

The adapter circuits in a given office, such as the adapter circuit 108 and another adapter circuit 122 to which is connected an individual recorder 124, are arranged in separate groups. As illustrated in FIG. 1, the seized toll ticketing adapter 108 is assigned to the "A" group while the adapter circuit 122 is assigned to the "B" group. Each of the circuit extending or control components, such as the adapter circuits 108 and 122, is provided with an individual designation, preferably comprising three digits. To provide means for supplying signals representing each of these designations for storage in the recorders 110 and 124 during the extension of a toll call, each of the adapter circuits 108 and 122 is selectively strapped to a single identifying or pulsing conductor in each of three groups thereof in accordance with the values of the hundreds, tens and units digits of the adapter designation. The identification conductors and certain pulsing and control leads for each of the adapters, such as the adapter 108, that is in the "A" group normally extend through a scanner supervisory circuit 126 to an "A" scanner or sender 118, whereas the similar conductors from the adapters in the "B" group, such as the adapter 122, normally extend through the scanner supervisory circuit 126 to a "B" scanner or sender 120.

To provide means for supplying instant date and time for storage in the recorders 110 and 124, the automatic toll ticketing system includes a clock and calendar circuit 116 which is common to all of the adapter circuits in the office. This circuit, which is preferably of the type disclosed in the above identified application, includes a plurality of stepping switches that are continuously adjusted to settings representing the digital values of date and time. A plurality of output digit marking leads from the stepping switches in the clock and calendar circuits extend to the pair of scanners 118 and 120. These scanners or digit sending circuits each include a first counting circuit for supplying a series of pulses proportional to the values of the date and time digits to be transmitted and a steering circuit for sequentially rendering each of the stepping switches in the clock and calendar circuit 116 effective to control the repeated operation of the first counting chain. In addition, each of the scanners or digit senders 118 and 120 includes a second counting circuit for supplying successive groups of a fixed number of pulses which are variably transmitted over the identifying conductors to the adapter circuits 108 and 122 to provide signals for storage in the recorders 110 and 124 representing the adapter designations.

As indicated above, during the extension of the toll connection and following the seizure of the toll ticketing adapter circuit 108, control circuits therein call for clock and calendar and adapter identification information at a proper position in the data collecting and recording program. When this information is to be stored in the recorder 110, the toll ticketing adapter 108 supplies a start signal to the scanner supervisory circuit 126. If both of the scanners 118 and 120 are in an idle condition, the start signal from the adapter 108 in the "A" group causes the seizure of the "A" scanner or sender 118. Concurrently therewith, the scanner supervisory circuit 126 disables a "B" scanner or sender 120 so that, in the event that a demand for clock and calendar and adapter identification information is placed by an adapter in the "B" group, this adapter circuit is locked out until such time as the necessary data has been provided to the calling adapter circuit in the "A" group. It should be noted that if more than one demand for date and time and adapter identification information is forwarded from the adapters in the A group, all of the adapters are enabled to concurrently receive the clock and calendar and adapter identification information.

When the "A" scanner or sender 118 is placed in operation, a series of groups of mark or digit representing pulses separated by space or control pulses is transmitted to all of the calling adapters in the "A" group for storage in the recorders, such as the recorder 110. Following the transmission of this information, the "A" scanner 118 initiates successive cycles of fixed length of the second counting arrangement to provide signals representing the adapter designations. These signals are variably transmitted over the identifying conductors extended from the various calling adapter circuits so that different groups of mark pulses separated by space pulses, each representing a different adapter identification, are concurrently transmitted to all of the calling adapters in the "A" group.

Following the completion of the transmission of these items of information, the "A" scanner or sender 118 is restored to a normal condition and the scanner supervisory circuit 126 is either restored to a normal condition or operates to render the "B" scanner or sender 120 effective to transmit date and time and adapter identification information to the recorders, such as the recorder 124, associated with the adapter circuits in the "B" group. By the provision of dual senders for transmitting date and time and adapter identification information to the two groups of adapter circuits, the holding time required to provide the necessary information is materially reduced.

In the event that an abnormal operating condition or alarm condition is established in either of the scanners 118 or 120, the scanner supervisory circuit 126 operates to transfer the adapter circuits associated with the inoperative scanner, such as the scanner 118, to the remaining operative scanner, such as the scanner 120. In this condition, calls for date and time and adapter identification information from the adapters in either of the groups will cause the operation of only the "B" scanner 120. Further, in the event that both of the scanners 118 and 120 develop alarm or abnormal operating conditions, the scanner supervisory circuit 126 locks out both of the scanners 118 and 120 and places an emergency scanner 128 in operation. This scanner or sender supplies a number of arbitrary digit representing signals equal to the digits normally provided by the senders 118 and 120 so that the recorders 110 and 124 are provided with the necessary number of items of information to permit the production of a record of the toll call during a playback or readout operation. It is possible to send arbitrary digits in place of the correct date andtime and adapter identification information inasmuch as these items are not necessary to permit the proper charging of the call and thus the toll call can be completed without requiring the presence of these items. In the event that the value of the tens hours digit of time provided by the clock and calendar circuit 116 is modified to indicate the rate structure applicable in establishing a monetary charge for the call, such as a night and holiday rate or a day rate, the value of the arbitrary tens hours digit provided by the emergency scanner or sender 128 is suitably chosen to provide correct operation of the rate interpreting facilities provided in the readout equipment.

Following the completion of the recording of all of the items of information pertaining to a toll call in the recorder 110, such as the identification of the calling and called parties, the duration of the connection, the date and time of placing the call, and the identification of the adapter, the extended switch train is restored and the toll ticketing adapter 108 automatically places an end-of-call code signal on the record medium in the recorder 110. This signal is used during the readout of the information from the recorder 110 to indicate that all of the items of information pertaining to the call have been recorded. The data stored in the recorders 110 and 124 can be played back to suitable recording facilities to provide permanent records of the toll ticketing information, including the monetary charge to be assessed for the call, by the use of any suitable data storing, translating, computing and recording facilities. One such system is disclosed in the copending application of M. A. Clement and B. A. Harris, Serial No. 536,579, filed September 26, 1955, which copending application is assigned to the same asignee as the present application.

TRUNK OR ADAPTER RECORDERS 110 AND 124

The trunk or adapter recorders 110 and 124 (FIG. 2), which are individually connected to one of the adapter circuits 108 and 122, provide means for storing data pertaining to toll calls which is automatically collected during the extension of the connection under the control of the adapter circuits 108 and 122. These recorders may be of any suitable type, although they preferably are of the construction disclosed in the copending application of Howard S. Gleason, Serial No. 378,209, filed September 3, 1953, now United States Patent No. 2,867,435. In general, the recorders 110 and 124 comprise a base plate on which is detachably mounted a magazine containing an endless loop of magnetic tape which is stored in random layer fashion. A portion of the magnetic tape, which is disposed outside of the magazine, is moved relative to a pair of transducing heads 270 and 280 by a step-by-step advancing mechanism including a pawl and ratchet drive arrangement driven by an advance magnet 260. The operation of the magnet 260 actuates the step drive mechanism so that the magnetic tape is advanced through a very small distance. Data is stored on the magnetic tape in the form of a series of groups of mark or intelligence pulses proportional to the values of the digits, which groups are separated from each other by a space or control pulse. The transducing heads 270 and 280 provide two magnetic gaps which are disposed adjacent contiguous, transversely spaced portions of the magnetic tape to define two separate channels for receiving mark and space pulse information. Thus, a digit is stored on the tape by a series of discrete signals in the mark pulse channel, and the successive groups of signals representing the values of successively stored digits are separated from each other by a space or control pulse recorded in the space pulse channel.

TRUNK OR ADAPTER CIRCUITS 108 AND 122

Figure 2:
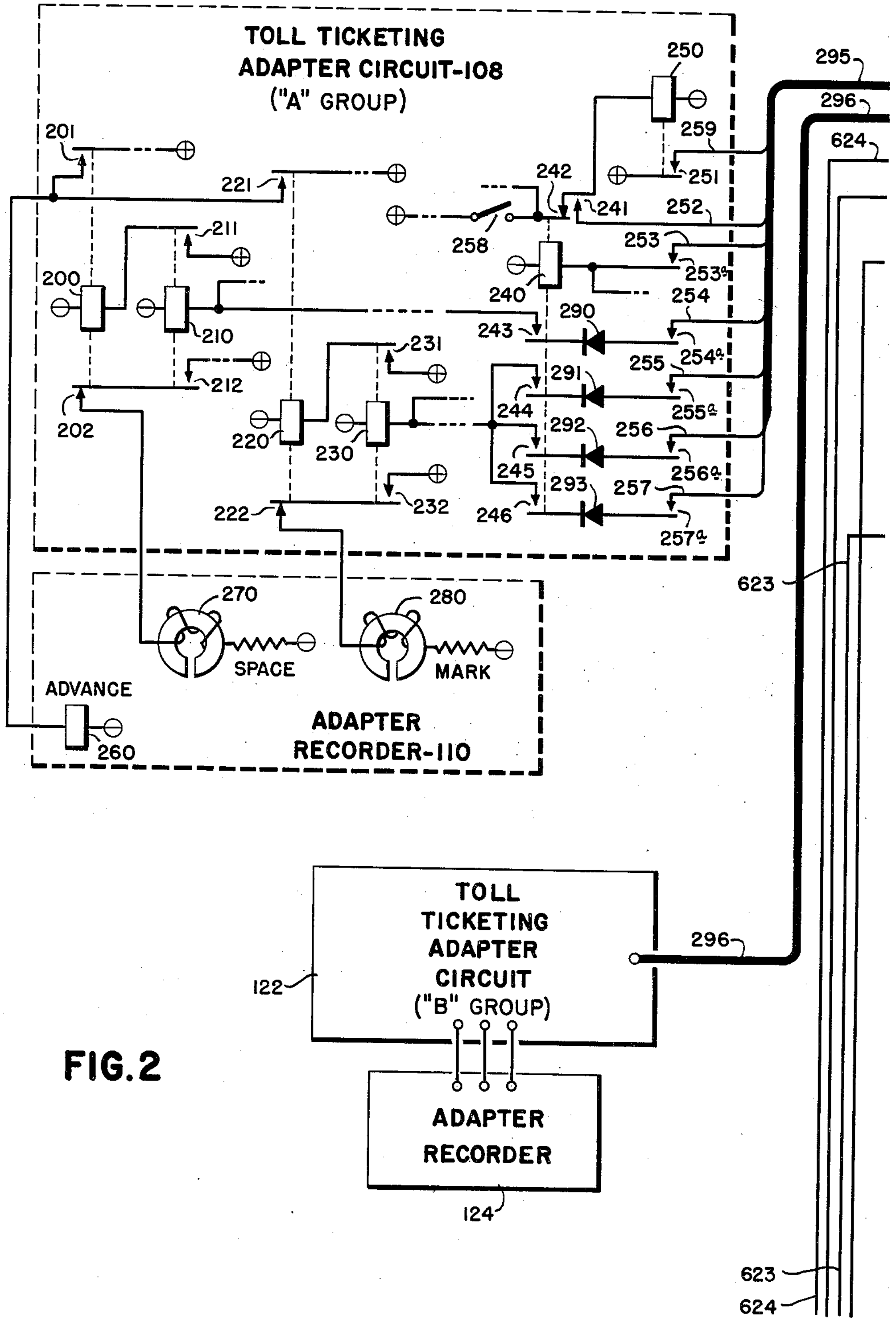
FIGS. 2–12 are schematic circuit diagrams illustrating the circuit arrangements embodying the present invention.

The toll ticketing adapter circuits 108 and 122 (FIG. 2), which are seized during the extension of a toll connection such as one between the subscribers "A" and "B," include means for automatically collecting items of information pertaining to the call and storing them in the associated adapter recorder 110 or 124. The adapters 108 and 122, which are essentially identical, can be of any well known type although they preferably are of the general construction shown and described in detail in the above identified copending Harris application. In FIG. 2 of the drawings, the adapter circuit 122 is shown in block form and the adapter 108 is illustrated in a fragmentary schematic form to show certain of the control circuits therein which are used for recording digital information in the connected recorder 110 and for providing information representing the designation of the adapter circuit 108.

When the adapter circuit 108 is seized during the extension of a toll call, circuits are prepared therein for operating a pair of mark relays 220 and 230 and a pair of space relays 200 and 210 so that certain items of information pertaining to the call, such as the designation of the calling and called subscribers, are recorded on the magnetic tape in the recorder 110 in the form of plurality of groups of mark pulses separated by space pulses. More specifically, when a mark pulse is to be recorded, the relay 230 is operated to close a plurality of contacts 231 and 232. The closure of the contacts 232 completes an energizing circuit for the mark pulse head 280 extending through a pair of normally closed contacts 222. The closure of the contacts 231 completes an obvious operating circuit for the second mark pulse relay 220, which, in operating, opens the contacts 222 and closes a pair of contacts 221. The opening of the contacts 222 interrupts the energizing circuit for the mark pulse head 80 so that the recording of the mark pulse is terminated. The closure of the contacts 221 completes an obvious operating circuit for the advance magnet 260 so that the step drive mechanism in the recorder 110 is operated to advance the tape a single step. When the adapter circuit 108 removes the operating ground from the winding of the first mark pulse relay 230, this relay and the second mark pulse relay 220 release to restore the contacts controlled thereby to their normal condition. The opening of the contacts 221 interrupts the energizing cuit for the advance magnet 260. The relays 220 and 230 are operated incident to the recording of each mark pulse on the tape in the recorder 110.

When a space pulse is to be recorded on the tape to signify the completion of the recording of the group of mark pulses representing the value of a stored digit, the adapter circuit 108 supplies ground to the operating winding of the first space pulse relay 210 so that this relay operates to close a plurality of contacts 211 and 212. The closure of the contacts 212 completes a circuit over a pair of normally closed contacts 202 to energize the winding of the space pulse head 270, thereby to record a space pulse on the magnetic tape immediately following the group of mark pulses representing the previously recorded digit. The closure of the contacts 211 completes an obvious operating circuit for the second space pulse relay 200 so that this relay operates to open the contacts 202 and to close a pair of contacts 201. The opening of the contacts 202 interrupts the energizing circuit for the space pulse head 270, thereby to complete the recording of the space pulse. The closure of the contacts 201 energizes the operating winding of the advance magnet 260. The adapter circuit 108 then removes the operating ground from the space pulse relay 210 so that this relay and the second space pulse relay 200 are released to terminate the energization of the advance magnet 260.

Figure 3:
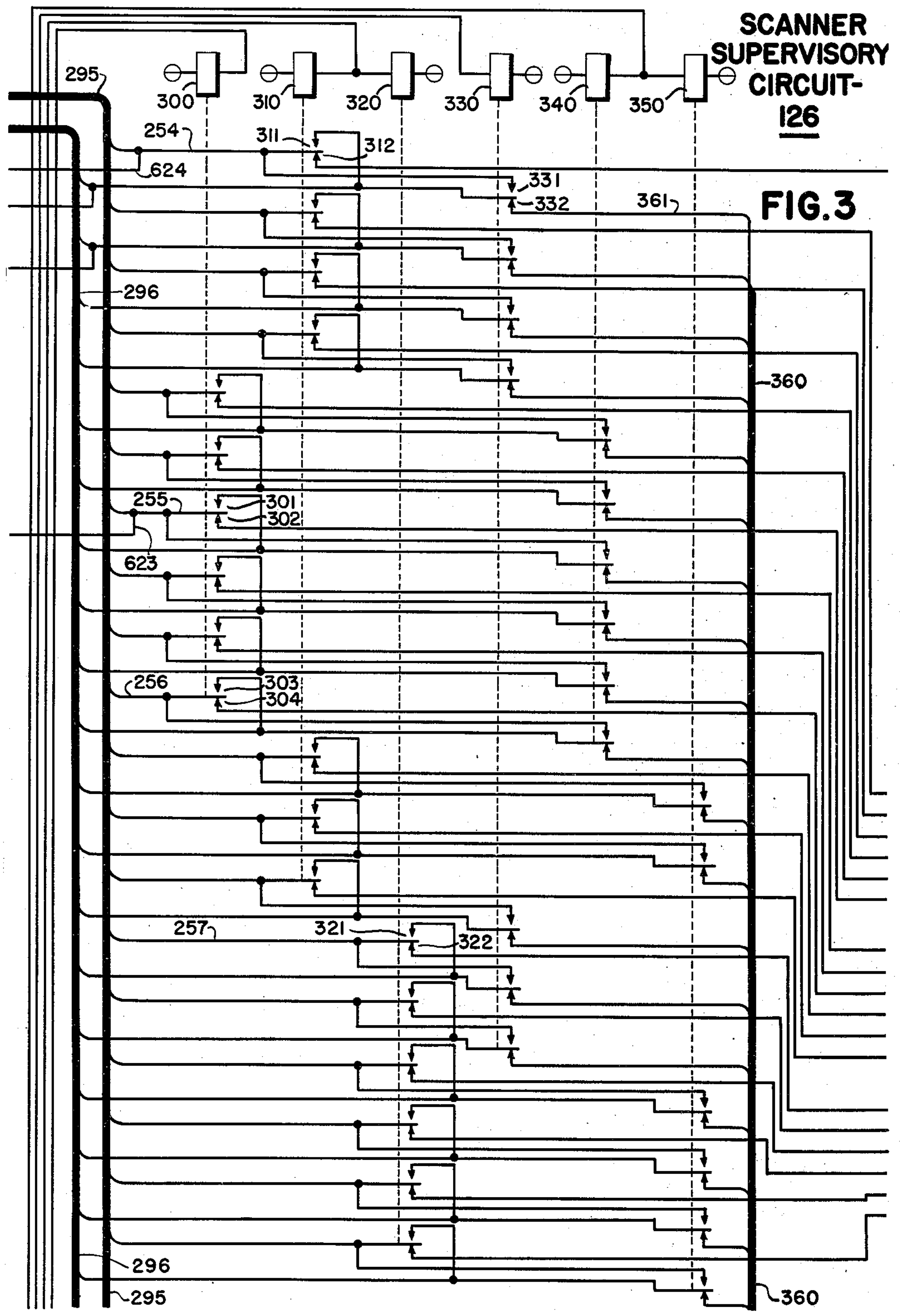

As indicated above, each of the adapter circuits, such as the circuits 108 and 122, is provided with an individual three digit designation which is stored in the associated recorder 110 or 124 during the extension of the toll call so that the line extending or control components used during the extension of each toll call can be ascertained. To provide this information, each of the adapter circuits is strapped to three identifying or pulsing conductors in three separate groups of these conductors which are common to the adapters in the "A" group in accordance with the values of the hundreds, tens and units digits of the designation individual to the associated adapter circuit. In the adapter circuit 108, three conductors 255, 256 and 257 are provided which represent, respectively, the hundreds, tens and units digits of the designation of the adapter circuit 108, and each of these conductors is connected through the circuit 126 (FIG. 3) to one identifying or pulsing conductor in each of three groups 496, 497 and 498 thereof in the "A" scanner 118. Assuming that the designation arbitrarily assigned to the adapter 108 is "6 3 1," the marking conductor 255 represents the digit "6," the conductor 256 represents the digit "3," and conductor 257 represents the digit "1." These conductors are normally extended over a cable 295 through a portion of the supervisory circuit 126 (FIG. 3) to the conductor "6" in the hundreds group 496, the conductor "3" in the tens group 497, and the conductor "1" in the units group 498. Since, as described above, the adapter circuit 108 is in the "A" group, the conductors 255—257 are normally extended to the "A" scanner or sender 118, whereas the similar pulsing or identifying conductors for the toll ticketing adapter circuit 122 are extended through a cable 296 and a portion of the supervisory circuit 126 to the "B" scanner or sender 120.

When the date and time and adapter identification information is to be provided, an operating circuit is prepared in the adapter circuit 108 for a relay 250. The completion of this circuit, which is represented by the closure of a switch 258 in FIG. 2, extends ground through a pair of normally closed contacts 242 to operate the relay 250. The operation of the relay 250 closes a plurality of contacts 251, 253*a*—257*a*. The closure of the contacts 253*a* prepares an operating circuit for a pickup relay 240, and the closure of the contacts 254*a*—257*a* prepares paths for applying pulses to the adapter 108 from the scanner 118, 120 or 128. The closure of the contacts 251 applies ground to a start conductor 259. This conductor extends start ground over the cable 295 to the supervisory circuit 126 to indicate that a trunk or adapter circuit in the "A" group requires date and time and adapter identification information.

If the clock and calendar circuit 116 and one of the scanners 118 or 120 is idle, a momentary pickup ground signal is returned by the supervisory circuit 126 over the cable 295 and a conductor 253 to operate the pickup relay 240. The operation of this relay opens the contacts 242 and closes a plurality of contacts 241, 243, 244, 245 and 246, among others. The operation of the relay 240 also closes a local holding circuit for this relay in the circuit 108. The contacts 241 and 242 form a make-before-break contact arrangement to transfer the operating circuit for the relay 250 to a hold conductor 252 which extends over the cable 295 to the supervisory circuit 126, thereby permitting the relay 250 to be held operated under the control of the circuit 126. The closure of the contacts 244, 245 and 246 interconnects the operating winding of the first mark relay 230 with the conductors 255, 256, and 257 through a plurality of blocking diodes 291, 292 and 293 and the closed contacts 255*a*—257*a*. Accordingly, the mark pulse relays 220 and 230 are now conditioned for operation under the control of one of the scanners 118 and 120 so that date and time and adapter identification information can be supplied to the adapter recorder 110. The closure of the contacts 243 connects the operating winding of the first space pulse relay 210 with a conductor 254 through a blocking diode 290 and the closed contact 254*a*. The conductor 254 extends over the cable 295 and a portion of the supervisory circuit 126 to space pulse generating means in the "A" scanner 118.

The adapter recorder 110 is now conditioned to receive date and time and adapter identification information from one of the senders 118 and 120 under the control of the clock and calendar circuit 116 and the scanner supervisory circuit 126. When all of these items of information have been stored on the magnetic tape in the recorder 110, ground is removed from the holding conductor 252 so that the relay 250 releases to open the contacts 251 and 253*a*—257*a*. The opening of the contacts 255*a*, 256*a* and 257*a* opens the paths for operating the mark pulse relay 230 from the senders 118 and 120, and the opening of the contacts 254*a* disables the operating circuits for the first space pulse relay 210. The opening of the contacts 251 removes start ground from the conductor 259, and the opening of the contacts 253*a* interrupts a point in the operating circuit for the relay 240, which relay can remain operated over local holding circuits in the adapter 108.

CLOCK AND CALENDAR CIRCUIT 116

The clock and calendar circuit 116 (FIG. 10) preferably is of the type shown and described in detail in the above identified copending Harris application and includes a plurality of stepping switches that are operated step-by-step to settings representing instant date and time under the control of a continuously operative timing pulse source. These stepping switches include a plurality of contact banks and wipers which provide marking signals representing the values of the digits representing date and time.

The clock and calendar circuit 116 is common to the "A" and "B" groups of adapters, including the adapter circuits 108 and 122, and to the "A" and "B" scanners or senders 118 and 120. When one of the adapter circuits calls for date and time and adapter information, the clock and calendar circuit 116 is rendered effective to control digit sending means in one of the senders 118 or 120 in accordance with its idle or busy condition and in accordance with the group in which the calling adapter is located. To provide means for controlling the scanners 118 and 120, the marking contact banks of the stepping switches in the circuit 116 are all connected to a common group of output or marking conductors representing the numerical notations "1" to "12," inclusive, which conductors extend through a cable 1090 to both of the senders 118 and 120. The digit representing conductors in the scanner 118 are in the lower left hand portion of FIG. 11 of the drawings. Ground is selectively supplied to one of these conductors in accordance with the value of the digit to be transmitted and is used to arrest cyclic operation of the first counting circuit in the sender 118 when the value of the selected digit has been transmitted to the calling adapter circuit. All of the days, hours and minutes designations are represented by "0" and "1"—"9," whereas the month designation comprises the notations "1"—"12" representing the months of January through December.

Figure 8:
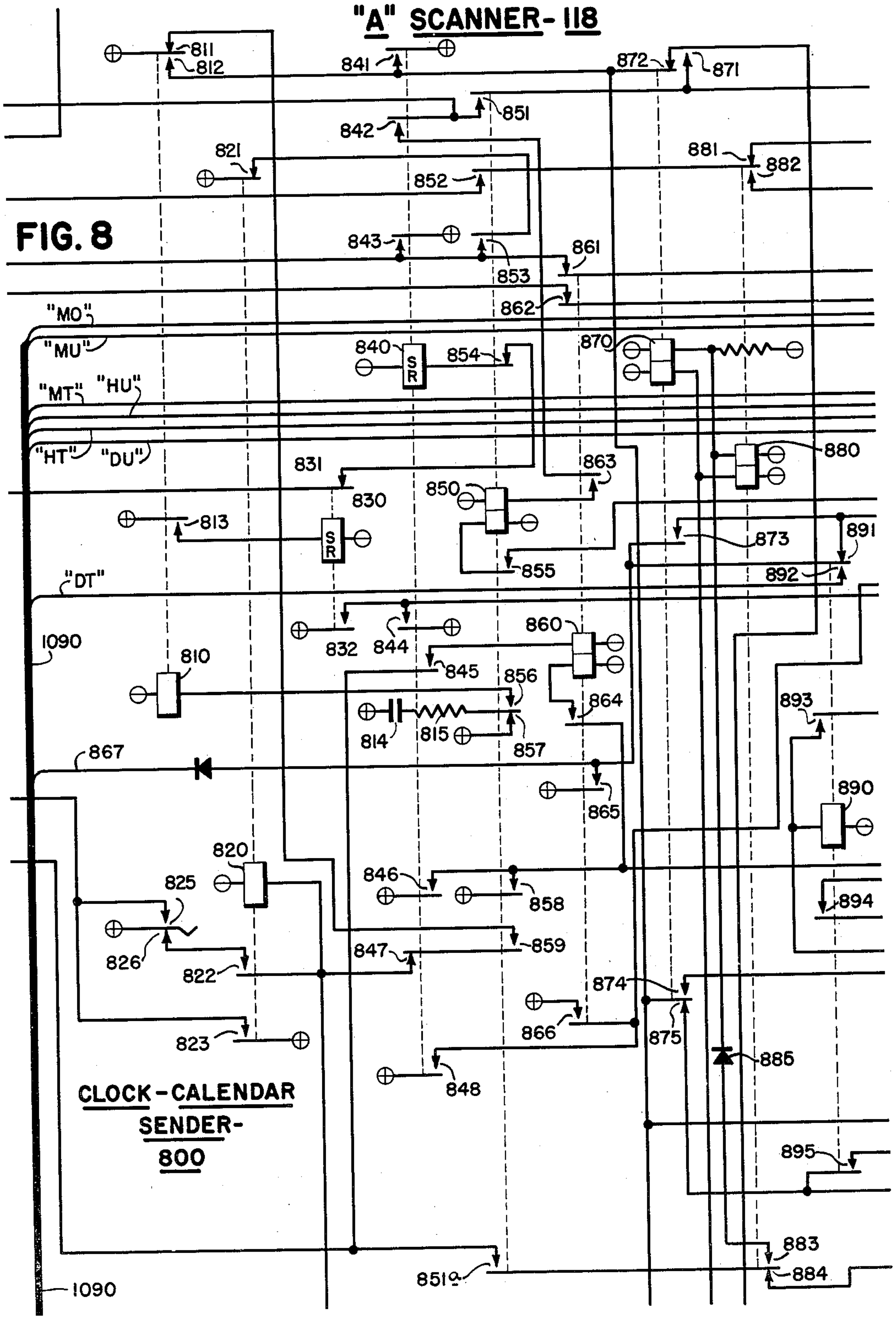
Figure 9:
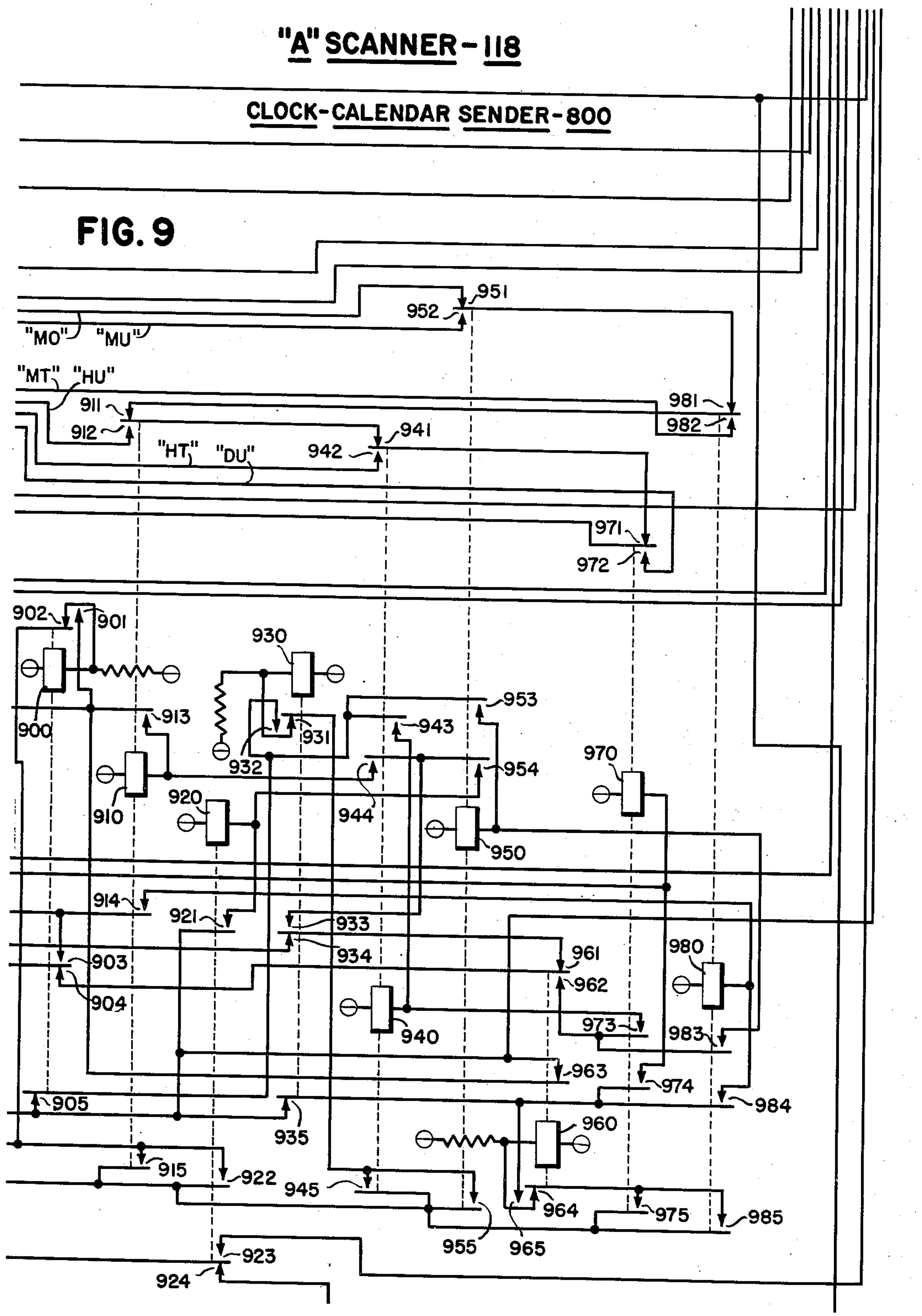

To provide means for forwarding a marking ground to the scanners 118 and 120 representing, in sequence, each of the digits of date and time, the senders 118 and 120 each include a steering circuit. As illustrated in FIG. 8 of the drawings, the "A" scanner or sender 118 includes a steering circuit arrangement for progressively applying ground to a plurality of conductors designated as "DT," "DU," "HT," "HU," "MT," "MU" and "MO" representing, respectively the tens days digit, the units days digit, the tens hours digit, the units hours digit, the tens minutes digit, the units minutes digit and the month numerical designation. The ground applied to the steering conductors is forwarded over the cable 1090 and a selected wiper in the clock and calendar circuit 116 to one of the digit representing conductors shown in FIG. 11 in accordance with the value of the corresponding digit or notation. For instance, if the value of the tens days digit is "2," the ground applied to the conductor "DT" in FIG. 8 is extended over the cable 1090 and one of the wipers in the circuit 116 to the "2" representing contact in the proper contact bank. This ground is returned to the "A" scanner 118 over the cable 1090 to be supplied to the lowermost of the conductors shown in FIG. 11 which is designated as "2."

The clock and calendar circuit 116 also includes a calendar guard relay 1060 which is like the similarly designated relay in the clock and calendar circuit shown in the above identified copending Harris application. The calendar guard relay 1060 is operated when the stepping switches in the circuit 116 are being advanced to certain settings so as to prevent the initiation of a date and time sending operation during those adjustments of the stepping switches that might give rise to a faulty digit sending operation. When the relay 1060 is operated, a pair of contacts 1061 are opened to prevent the seizure of either of the senders 118 and 120.

SCANNER SUPERVISORY CIRCUIT 126

Figure 7:
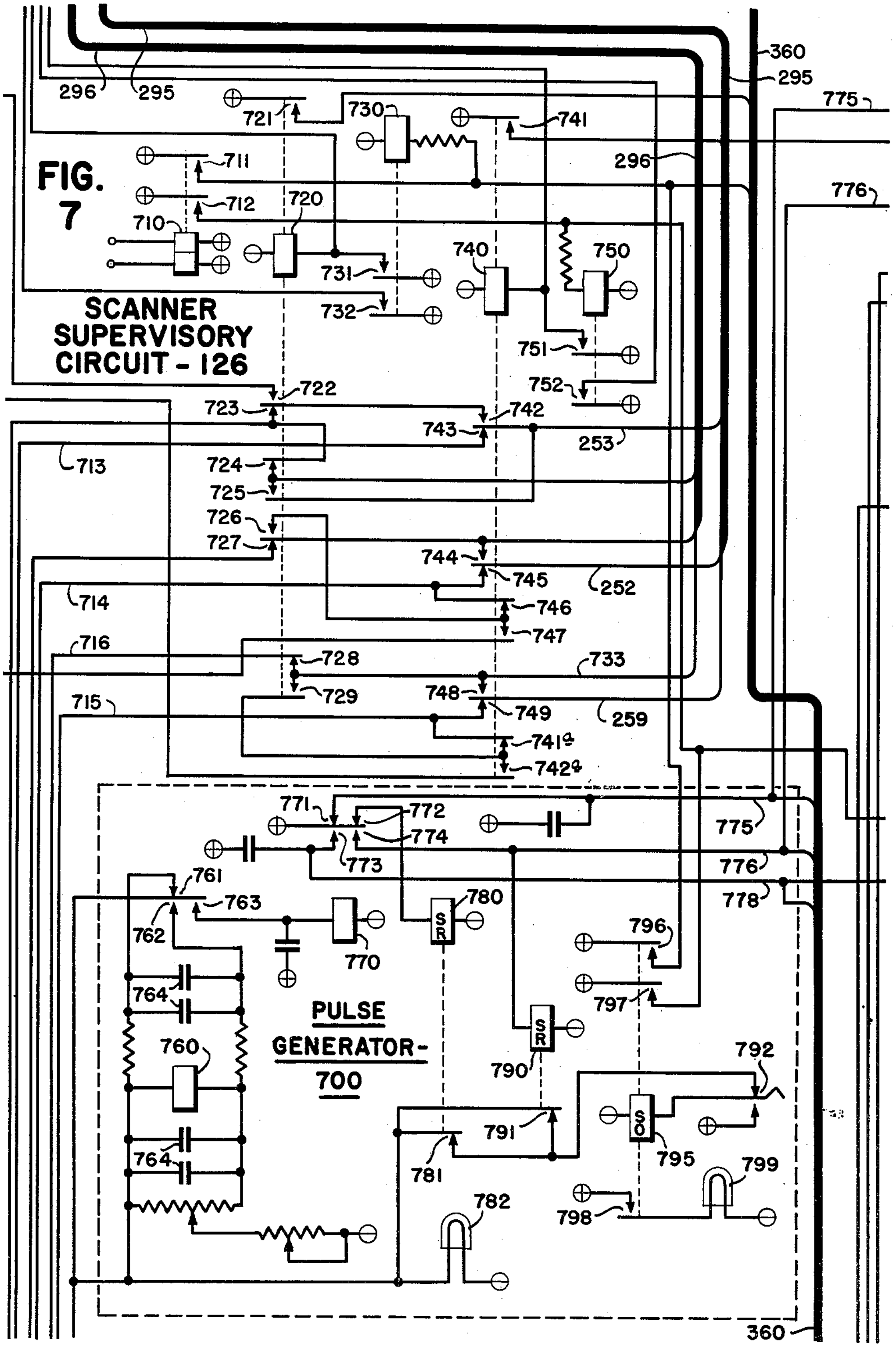

The supervisory circuit 126 (FIGS. 3, 7 and 10) is controlled by the adapter circuits 108 and 122 to render a selected one of the senders or scanners 118 and 120 effective under the control of the clock and calendar circuit 116 to transmit date and time and adapter identification information to the adapter recorders 110 and 124 in accordance with the group in which the calling adapter circuit is located. In the event that either of the circuits 118 or 120 encounters an abnormal operating condition, its sending functions are transferred to the other of the senders to insure continuity of service. Alternatively, if abnormal operating conditions are encountered in both of the senders 118 and 120 or in a component common to both of these senders, the supervisory circuit 126 takes both of scanners 118 and 120 out of service and renders the emergency sender 128 effective to supply arbitrary signals to the recorders 110 or 124.

To initiate a normal operation of the supervisory circuit 126 when the toll ticketing adapter circuit 108, for instance, requires the transmission of date and time and adapter identification information, the relay 250 is operated, as described above, to close the contacts 251, among others. The closure of these contacts extends ground over the conductor 259, the cable 295, a pair of normally closed contacts 749, a conductor 715 to one terminal of the lower operating winding of a relay 1000. The other terminal of this winding is connected to grounded battery through a plurality of normally closed contacts 1042 and 1034, the contacts 1061 and a pair of normally closed contacts 1052. The completion of this circuit operates the relay 1000 so that a plurality of contacts 1001—1005 are closed. Since the operating circuit for the relay 1000 extends through the contacts 1061, this relay cannot be operated to initiate the seizure of one of the senders 118 or 120 when the clock and calendar circuit 116 is engaged in advancing certain of the stepping switches to certain of their settings which may give rise to the application of faulty marking signals to one of the output conductors.

The closure of the contacts 1002 completes a holding circuit for the relay 1000 extending to ground through a plurality of normally closed contacts 1033, 861 and 591. The contacts 591 are normally held in a closed condition by a differential relay 590, the lower winding of which is strapped between grounded battery and ground. Since the relay 590 is normally in an operated condition, the contacts controlled by this relay are shown in an operated condition.

The closure of the contacts 1005 applies ground to a pulse generator 700 (FIG. 7) which forms a part of the supervisory circuit 126 and which is common to both of the senders or scanners 118 and 120. The pulse generator 700 supplies operating signals to both of these scanners and is placed in operation by the operation of the relay 1000.

The closure of the contacts 1003 shunts a relay 1020 to prevent its operation and also completes an operating circuit for a relay 1050 which extends from ground through the closed contacts 1003 and a plurality of normally closed contacts 1023 and 1021. The operation of the relay 1050 closes a plurality of contacts 1051, 1054 and 1055 and opens the contacts 1052 and a pair of contacts 1053. The closure of the contacts 1051 completes an alternative holding circuit for the relay 1000 shunted around the contacts 1033. The opening of the contacts 1052 interrupts the above described operating circuit for the lower winding of the relay 1000, but this relay remains operated over the above described holding circuit. Thus, the opening of the contacts 1052 prevents the seizure of the supervisory circuit 126 by any other adapter circuit in either the "A" or "B" group. The opening of the contacts 1053 removes the ground normally extended over the conductor 1090 to the clock and calendar circuit 116 to prevent the initiation of a display operation in which the values manifested by the settings of the various register switches are visually displayed. The closure of the contacts 1054 completes an operating circuit for the relay 1030 extending through the closed contacts 1004.

In operating, the relay 1030 closes a plurality of contacts 1031, 1032, 1035 and 1037 and opens the contacts 1033 and 1034 and a pair of contacts 1036. The closure of the contacts 1035 completes a holding circuit for the relay 1030 extending to ground at the closed contacts 1054 through a pair of normally closed contacts 1025. The opening of the contacts 1034 interrupts an additional point in the operating circuit for the lower winding of the relay 1000, and the opening of the contacts 1033 interrupts the above described holding circuit for the upper winding of this relay, which circuit remains completed at the closed contacts 1051. The closure of the contacts 1032 completes the operating circuit for the pickup relay 240 in the calling adapter circuit 108. This circuit extends from a normally closed and grounded pair of contacts 586 in the "A" scanner 118 through a pair of normally closed contacts 862, the closed contacts 1032, a conductor 713, a pair of normally closed contacts 743 and thence over the conductor 253 and the cable 295 to the operating winding of the pickup relay 240 through the closed contacts 253a.

In operating, the pickup relay 240 closes the contacts 241 and 243—246 and opens the contacts 242. The contacts 241 and 242 form a make-before-break contact arrangement so that the closure of the contacts 241 completes a holding circuit for the relay 250 prior to the opening of the contacts 242 to interrupt the above described operating circuit for the relay 250. The holding circuit for the relay 250 extends from the operating winding thereof through the closed contacts 241, the conductor 252, the cable 295, a pair of normally closed contacts 745 and a conductor 714 to the holding ground provided for the relay 1000. Thus, the relay 250 in the calling adapter 108 is maintained operated over a holding circuit extending to the "A" scanner 118.

Referring back to the above described operation of the pickup relay 240, the closure of the contacts 243—246 interconnects the mark and space pulse relays in the adapter circuit 108 with the conductors extending over the cable 295 to the supervisory circuit 126. The supervisory circuit 126 includes a plurality of relays 300, 310, 320, 330, 340 and 350 which selectively interconnect the pulsing leads from the adapter circuits 108 and 122 with the senders 118 and 120. The relays 300, 310 and 320, in a released condition, extend the pulsing leads for the adapters in the "A" group to the "A" scanner 118, and the relays 330, 340 and 350 normally extend the pulsing conductors in the cable 296 from the adapters in the "B" group to the "B" scanner or sender 120 over a cable 360. For instance, with the "A" group relays 300, 310 and 320 in a released condition, the conductors 254, 255, 256 and 257 are connected through a plurality of normally closed contacts 302, 304, 312 and 322 to the "A" scanner 118. Thus, the operation of the pickup relay 240 in the calling adapter circuit 108 in response to the operation of the relay 1030 in the supervisory circuit 126 renders the pulse recording components in the adapter 108 responsive to control from the "A" sender 118.

Referring back to the above described operation of the relay 1030, the closure of the contacts 1031 extends ground from the closed contacts 1001 through a plurality of normally closed contacts 831 and 854 to complete an operating circuit for a start relay 840 in the "A" scanner 118. The operation of the relay 840 initiates a cycle of operation of this scanner during which date and time information and the identity of the adapter 108 is transmitted to and stored in the adapter recorder 110, as described in detail below.

Since marking ground signals representing the various digits of date and time are supplied to both of the senders 118 and 120 by the clock and calendar circuit 116 under the control of the seized one of these senders, the supervisory circuit 126 includes means for preventing the association of the "B" scanner 120, for instance, with an adapter in the "B" group, such as the adapter 122, following the seizure of the scanner 118. Thus, if a start ground is forwarded by the adapter circuit 122 over the cable 296 to a conductor 733 following the seizure of the "A" scanner 118, this ground is extended through a pair of normally closed contacts 728 and a conductor 716 to the lower operating winding of a relay 1010. The other terminal of the lower winding of the relay 1010 is connected through the contacts 1037, which were closed by the operation of the relay 1030, and the normally closed contacts 1061 to the contacts 1052. However, these contacts are opened by the operation of the guard relay 1050 incident to the seizure of the "A" scanner 118. Accordingly, the relay 1010 cannot be operated at this time to seize the "B" scanner 120. Thus, the adapter circuit 122 awaits the release of the clock and calendar circuit 116 by the previously seized "A" scanner 118.

Assuming that none of the adapter circuits in the "B" group have attempted to seize the scanner 120, when the seized "A" scanner 118 completes a cycle of operation, ground is removed from the holding circuit for the relays 250 and 1000. The relay 1000 releases to, in turn, release the relays 1050 and 1030. The release of the relay 250 removes start ground from the conductor 259 and disconnects the pulsing conductors of the "A" scanner 118 from the mark and space relays in the adapter circuit 108. These operations restore the supervisory circuit 126 to a normal condition in which it is capable of being operated by a calling adapter circuit in either of the "A' or "B" groups when date and time and adapter identification information is next required.

Assuming, however, that during the transmission of date and time and adapter identification information by the "A" scanner 118, a start ground is supplied by the adapter circuit 122 in the "B" group. As set forth above, this ground is extended to one terminal of the lower operating winding of the relay 1010, the other terminal of which is disconnected from grounded battery at the open contacts 1053. When ground is removed from the holding circuit of the relay 1000, as described above, the relay 1000 releases to restore the contacts controlled thereby to their normal condition. The opening of the contacts 1055 removes start ground from the pulse generator 700 so that operation of this circuit is arrested. The opening of the contacts 1003 interrupts the operating circuit for the guard relay 1050 so that this relay releases to restore the contacts controlled thereby to their normal condition. The opening of the contacts 1054 interrupts the holding circuit for the relay 1030, but this relay is slow-to-release. The closure of the contacts 1052 connects resistance battery to the other terminal of the lower winding of the relay 1010 so that this relay operates to close a plurality of contacts 1011, 1012, 1013 and 1014.

The closure of the contacts 1013 prepares a holding circuit for the relay 1010 extending to an open pair of contacts 1027. The closure of the contacts 1012 reapplies start ground to the pulse generator circuit 700. The closure of the contacts 1011, together with the prior opening of the contacts 1003 when the relay 1000 is released, completes an operating circuit for a relay 1020 which operates to open the contacts 1021, 1023 and 1025 and to close a plurality of contacts 1022, 1024, 1026 and 1027.

The closure of the contacts 1027 completes a holding circuit for the relay 1010 extending from the upper winding of this relay through the closed contacts 1013 and 1027 and a pair of normally closed contacts 1045 to a source of holding ground in the "B" scanner 120. The closure of the contacts 1022 completes a circuit extending from the closed and grounded contacts 1011 for again operating the guard relay 1050. In operating, the relay 1050 opens the contacts 1052 to disconnect resistance battery from the seizure circuits for the "A" and "B" scanners 118 and 120, thereby to prevent the operation of the relay 1000 in the event that an adapter circuit in the "A" group supplies start ground during the period in which information is being transmitted by the "B" scanner 120. The closure of the contacts 1055 by the operation of the relay 1050 completes an alternative holding circuit for the relay 1010.

Referring back to the operation of the relay 1020, the closure of the contacts 1026 and 1054 completes an operating circuit for a relay 1040 which operates to open the contacts 1042, 1044 and 1045 and to close a plurality of contacts 1041, 1043, 1046 and 1047. The closure of the contacts 1043 completes a holding circuit for the relay 1040 extending to the closed and grounded contacts 1054 through the closed contacts 1024. The opening of the contacts 1045 interrupts one branch of the holding circuit for the relay 1010, but this relay remains operated over the holding circuit provided at the closed contacts 1055. The closure of the contacts 1047 extends ground from the closed contacts 1014 to the "B" scanner 120 to place this scanner 120 in operation. The closure of the contacts 1046 forwards ground to the pickup relay in the adapter 122 corresponding to the relay 240 in the adapter circuit 108 so that this relay is operated to cut-through the pulsing paths extending from the "B" scanner 120 over the cable 360, the normal contacts of the relays 330, 340 and 350, and the cable 396. Thus the "B" scanner or sender 120 is placed in operation to transmit date and time information and the identification of the adapter circuit 122 for storage in the adapter recorder 124.

As described above, the release of the relay 1050 to open the contacts 1054 and the release of the relay 1000 to open the contacts 1004 interrupts the operating and holding circuits for the relay 1030 which is slow-to-release. After its slow-to-release interval, which is sufficiently long to prevent another adapter in the "A" group from seizing the "A" sender 118 prior to the seizure of the "B" scanner or sender 120 by a waiting adapter circuit in the "B" group, the relay 1030 releases to restore the contacts controlled thereby to their normal position. The release of the relay 1030 completes the preparation of the supervisory circuit 126 for permitting the seizure of the "A" scanner 118 by a calling adapter circuit in the "A" group either after the release of the "B" scanner 120 or in response to the release of the "B" scanner 120 in the event that one of the adapter circuits in the "A" group calls for date and time information prior to the completion of the cycle of operation of the "B" sender 120.

When the cycle of operation of the "B" sender 120 is completed, holding ground is removed from the closed contacts 1055 so that the relay 1010 releases. The release of this relay causes the release of the guard relay 1050 and the relay 1040 to restore the supervisory circuit 126 to a normal condition. Further, incident to this restoration of the circuit 126, the relay in the adapter circuit 122 corresponding to the relay 250 in the adapter circuit 108 is restored to interrupt the interconnection between the "B" sender 120 and the mark and pulse transmitting circuits in this adapter.

As indicated above, the supervisory circuit 126 operates in response to the existence of an abnormal operating condition in either of the scanners 118 or 120 to transfer the sending operations normally allocated to the inoperative scanner to the other of the two scanners 118 or 120. More specifically, assuming that an abnormal operating condition is encountered in the "A" scanner 118 which would prevent its functioning to provide date and time and adapter identification information, an alarm relay 820 is operated to close a pair of contacts 823 to complete an obvious operating circuit for an "A" scanner transfer relay 750. This relay can also be operated by actuation of a manual key to close a pair of normally open contacts 825. The operation of the relay 750 closes a plurality of contacts 751 and 752. The closure of these two contacts completes obvious operating circuits for the relays 300, 310 and 320 so that these relays operate.

The operation of these three relays transfers the pulsing paths extending to the adapters in the "A" group to the "B" scanner 120 and thus conditions the "A" group adapters to receive date and time and adapter identification information from the "B" scanner 120 rather than from the "A" scanner 118. More specifically, in operating, the relay 300 opens the contacts 302 and 304, among others, and closes a plurality of contacts 301 and 303. The opening of the contacts 302 and 304 disconnects the hundreds and tens digit conductors 255 and 256 extending to the adapter circuit 108 from the "A" scanner 118, and the closure of the contacts 301 and 303 connects these conductors to similar conductors extending through the cable 360 to the "B" scanner 120. Similarly, the operation of the relay 310, in opening the contacts 312 and closing a pair of contacts 311, disconnects the space pulse conductor 254 extending to the adapter 108 from the "A" scanner 118 and connects it through a pair of closed contacts 332 to a space pulse conductor 361 which extends to the "B" scanner 120 over the cable 360. The operation of the relay 320, in opening the contacts 322 and in closing a pair of contacts 321, disconnects the units marking conductor 257 from the "A" scanner 118 and connects it to the "B" scanner 120 over the cable 360.

The closure of the contacts 751, when the "A" transfer relay 750 is operated, also completes an obvious operating circuit for an "A" transfer assist relay 740 which operates to close a plurality of contacts 741, 742, 744, 747, 748 and 742*a* and to open the contacts 743, 745, 746, 749 and 741*a*. The closure of the contacts 741 applies ground to the upper operating winding of the normally operated differential relay 590 in the "A" scanner 118 so that this relay releases. In releasing, the relay 590 performs, among other, the function of removing the ground normally provided at the closed contacts 591 and 586. The removal of these sources of ground prevents the seizure of the sender 118. Referring back to the operation of the relay 740, the opening of the contacts 749 and the closure of the contacts 748 disconnects the common start lead 259 for the adapters in the "A" group from the conductor 715 and connects it through the normally closed contacts 728 to the conductor 716 that extends to the relays in the supervisory circuit 126 which control the seizure of the "B" scanner 120. Similarly, the opening of the contacts 745 and 743 and the closing of the contacts 742 and 744 disconnect the hold and pick-up conductors 252 and 253 from the conductors 713 and 714 extending to the "A" scanner allotting portion of the supervisory circuit 126 and connects them to similar conductors extending to the "B" scanner allotting portion of the supervisory circuit 126. Thus, in response to the establishment of an abnormal operating condition in the "A" scanner 118, the pulsing paths from the adapter circuits in the "A" group which are normally extended to the "A" scanner 118 are transferred to the "B" scanner 120 and the control functions normally performed by one portion of the supervisory circuit 126 are asigned to another portion of the supervisory circuit 126. When the relays 740 and 750 are released, the supervisory circuit 126 is restored to a normal condition in which the "A" scanner 118 is seized by adapter circuits in the "A" group.

Similarly, in the event that an abnormal operating condition is established in the "B" scanner 120, means are provided in the supervisory circuit 126 for transferring the digit sending functions of the scanner 120 to the "A" scanner 118. The existence of an abnormal operating condition in the scanner 120 causes the application of ground to a conductor in the cable 360 which extends to the operating winding of a "B" transfer relay 730. The relay 730, in operating, closes a plurality of contacts 731 and 732. The closure of these two pairs of contacts operates the relays 330, 340 and 350 so that the pulsing leads normally extending to the adapters in the "B" group, such as the adapter 122, from the "B" scanner 120 are transferred to the "A" scanner 118. The closure of the contacts 731 also operates a "B" transfer assist relay 720 which, in operating, opens the contacts 723, 724, 727 and 728 and closes a plurality of contacts 721, 722, 725, 726 and 729. The operation of the contacts controlled by the relay 720 transfers the control leads normally extending from the adapter or trunk circuits in the "B" group to the "B" scanner seizing portion of the supervisory circuit 126 to the "A" scanner seizing portion. Thus, the application of a start ground to the conductor 733 by one of the adapters in the "B" group causes the operation of the relays 1000, 1030 and 1050, as described above, to assign the "A" scanner 118 to supply date and time and adapter identification information to the recorders in the "B" group.

As indicated above, the supervisory circuit 126 also includes means for transferring the digit sending functions of both of the scanners 118 and 120 to the emergency scanner 128 in the event that both of these scanners become inoperative or in the event that any control or pulsing component common to these scanners is placed in an inoperative condition. More specifically, if the pulse generator 700 which provides a common source of operating pulses for both of the scanners 118 and 120 is placed in an inoperative condition, an alarm relay 795 in the pulse generator 700 is operated to close a plurality of contacts 796, 797 and 798. The closure of the contacts 798 energizes a lamp 799 to provide a visible indication of the operative condition of the generator 700. The closure of the contacts 796 and 797 completes obvious operating circuits for the "A" transfer relay 750 and the "B" transfer relay 730. Similarly, in the event that the power supply, for instance, for the scanners 118 and 120 becomes inoperative, negative battery is applied to two terminals connected to the windings of a fuse alarm relay 710 so that this relay operates to close a plurality of contacts 711 and 712. The closure of these two contacts similarly operates the "A" transfer relay 750 and the "B" transfer relay 730. Thus, the existence of any abnormal operating condition which renders both of the scanners 118 and 120 inoperative causes the operation of both of the transfer relays 730 and 750.

As described above, the operation of these two relays causes the operation of all of the relays 300, 310, 320, 330, 340 and 350. The operation of these relays disconnects the pulsing circuits extending to all of the adapter circuits from both of the scanners 118 and 120. As an example, the relay 310, in operating, opens the contacts 312 to disconnect the space pulse conductor 254 for the scanners in the "A" group from the "A" scanner 118, and the operation of the relay 330 to open the contacts 332, disconnects this pulsing conductor from the space pulse conductor 361 extending to the "B" scanner 120. Similarly, the operation of the relays 300, 310, 320, 330, 340 and 350 disconnects the pulsing paths between the scanners 118 and 120 and all of the adapter circuits in the "A" and "B" groups.

The operation of the relays 730 and 750 also operates the relays 720 and 740 so that the seizure functions by which one or the other of the senders 118 and 120 is seized by a calling adapter circuit is transferred to the emergency sender or scanner 128. More specifically, the start conductors 733 and 259 extending to the "A" and "B" scanners are disconnected from the conductors 715 and 716 and connected to a start conductor extending to the emergency scanner 128. The conductor 733 is disconnected from the conductor 716 by the opening of the contacts 728 and is connected to the start conductor extending to the scanner 128 through the closed contacts 729 and **742*a*. Similarly, the start conductor 259 is disconnected from the conductor 715 by the opening of the contacts 749 and is connected to the start conductor for the scanner 128 through the closed contacts 748, 729 and 742*a*. In a like manner, the operation of the contacts 722, 723, 724, 725, 742 and 743 extend the pickup conductors from the two groups of adapter circuits, including the conductor 253, to a pickup conductor extending to the emergency scanner 128. The operation of the contacts 726, 727, 744, 745, 746 and 747 extend the hold conductors from the adapters in the "A" and "B" groups to a hold conductor extending to the emergency scanner 128**.

Accordingly, when any one of the adapter circuits 108 and 122 in either of the groups of adapters requires date and time and adapter identification information, the seizure circuits controlled by the calling adapter circuits are extended to the emergency sender 128 and do not cause the operation of the scanners 118 and 120. Thus, the scanner 128 is placed in operation to provide arbitrary signals representing the desired items of information over pulsing paths which are strapped directly from the scanner 128 through the input pulsing leads to the adapter circuits. The normal pulsing paths extending to the scanners 118 and 120 are interrupted by the operation of the supervisory circuit 126, as described above. The supervisory circuit 126 is restored to a normal condition by the release of the relay 710 and the release of the transfer relays 730 and 750 so that the adapters in the "A" group are normally provided with information from the scanner 118 and the adapters in the "B" group are normally provided with information from the "B" scanner 120.

The pulse generator circuit 700 (FIG. 7) is placed in operation by the operation of either of the relays 1000 or 1010 to provide a source of driving pulses for both of the senders 118 and 120. The pulse generator 700 preferably includes a relay 760 of the mercury contact type, such as a HGP–1004 type relay manufactured by C. P. Clare and Company of Chicago, Illinois. This relay includes a plurality of pairs of contacts 761, 762 and 763 which are alternately opened and closed in response to opposite energization of the operating winding. Whenever either of the pairs of contacts 1005 or 1012 is closed to ground a start conductor for the pulse generator 700, a lamp 782 is energized to indicate the operation of the generator 700, and this ground is further forwarded through the contacts 761, for instance, to initiate the charging of a plurality of condensers 764. When these condensers have been sufficiently charged, the relay 760 operates to open the contacts 761 and to close the contacts 762 and 763. The closure of the contacts 762 initiates the charging of the condensers 764 in an opposite direction so that, after a sufficient charge has been accumulated on these condensers, the relay 760 releases to close the contacts 761 andto open the contacts 762 and 763. This intermittent operation and release of the relay 760 continues as long as ground is provided at either of the pairs of contacts 1005 and 1012.

The intermittent closure of the contacts 763 forwards the ground provided at the contacts 1005 and 1012 to complete an obvious operating circuit for a relay 770, which preferably is also of the mercury contact type. The intermittent operation of the relay 770 opens and closes a plurality of contacts 771, 772, 773 and 774. When the contacts 771 and 772 are closed, ground is supplied through the closed contacts 771 to a first pulsing conductor 775 which extends to the "A" scanner 118 and to the "B" scanner 120 over the cable 360. When the relay 770 is operated to close the contacts 773 and 774, ground is supplied through the closed contacts 774 to a second pulsing conductor 776 which extends to the "A" scanner 118 and over the cable 360 to the "B" scanner 120. This ground is further supplied over the closed contacts 773 to a third pulsing conductor 778 which extends over the cable 360 to the "B" scanner 120 and also to the "A" scanner 118.

To provide means for determining the operability of the pulse generator 700, a pair of control relays 780 and 790 are provided. The relay 780, which is slow-to-release, is operated when the contacts 772 are closed in one position of the relay 770, and the relay 790, which is also slow-to-release, is operated when the contacts 774 are closed in the other position of the relay 770. Thus, both of the relays 780 and 790 are normally operated when the pulsing relays 760 and 770 are in proper operating condition to maintain a pair of contacts 781 and 791 in an open condition. However, if either of the pulsing relays 760 and 770 fails to operate properly, one of the relays 780 or 790 is released to close one of the contacts 781 or 791. The closure of one of these pairs of contacts forwards the ground provided on the start conductor through a pair of normally closed contacts 792 on an alarm key to complete an operating circuit for a slow-to-operate relay 795. If ground is applied to the operating winding of the alarm relay 795 for more than the slow-to-operate period of this relay, the relay 795 operates to close the contacts 796, 797 and 798.

The closure of the contacts 796 and 797 operates the relays 730 and 750 as described above so that both of the senders 118 and 120 are taken out of operation and all data supplying functions are transferred to the emergency scanner 128. The closure of the contacts 798 energizes a lamp 799 to provide a visible indication of the inoperative condition of the pulse generator 700. The alarm relay 795 can be manually restored to a normal condition by operating the alarm key to open the normally closed contacts 792.

"A" SCANNER OR SENDER 118

Figure 4:
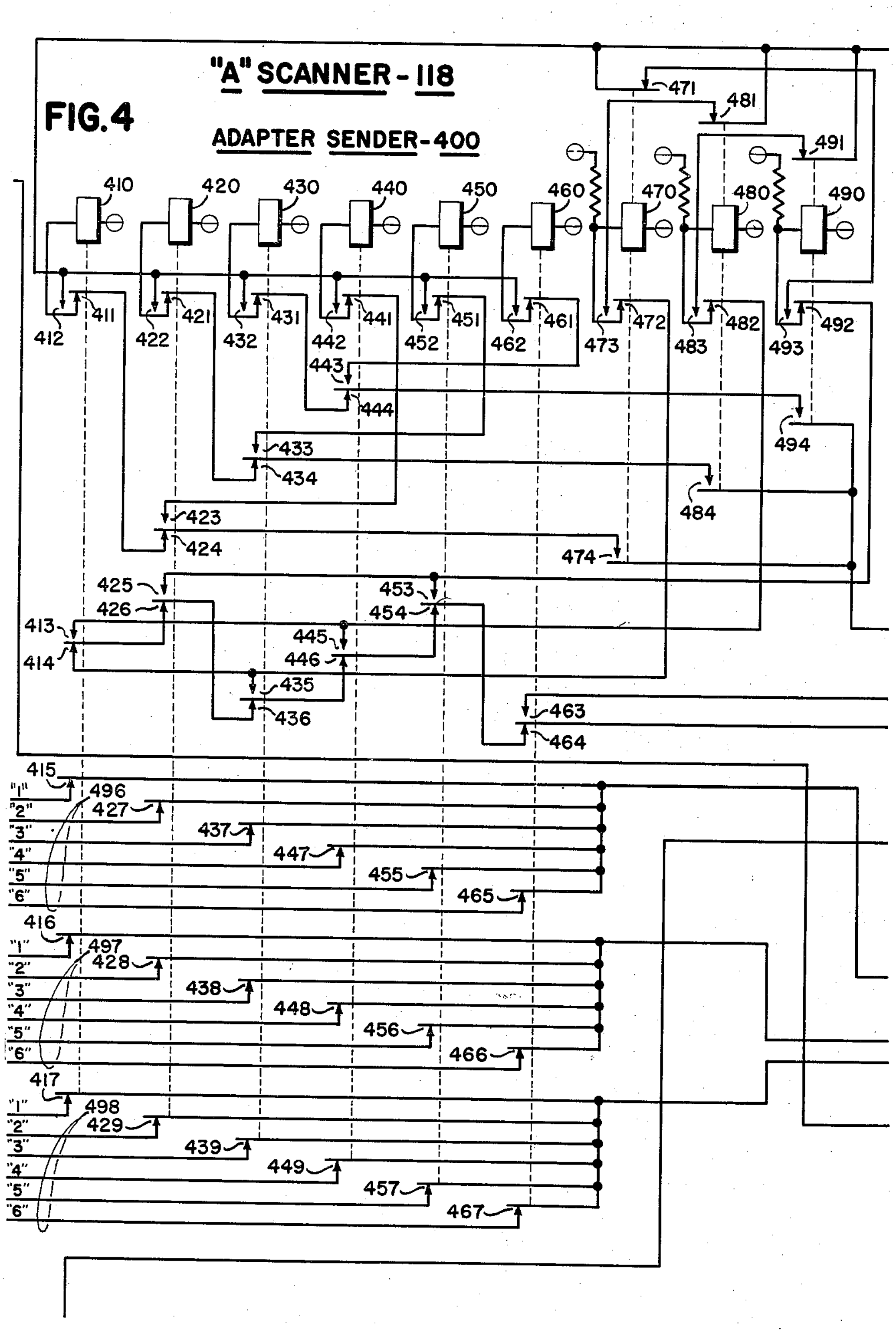
Figure 5:
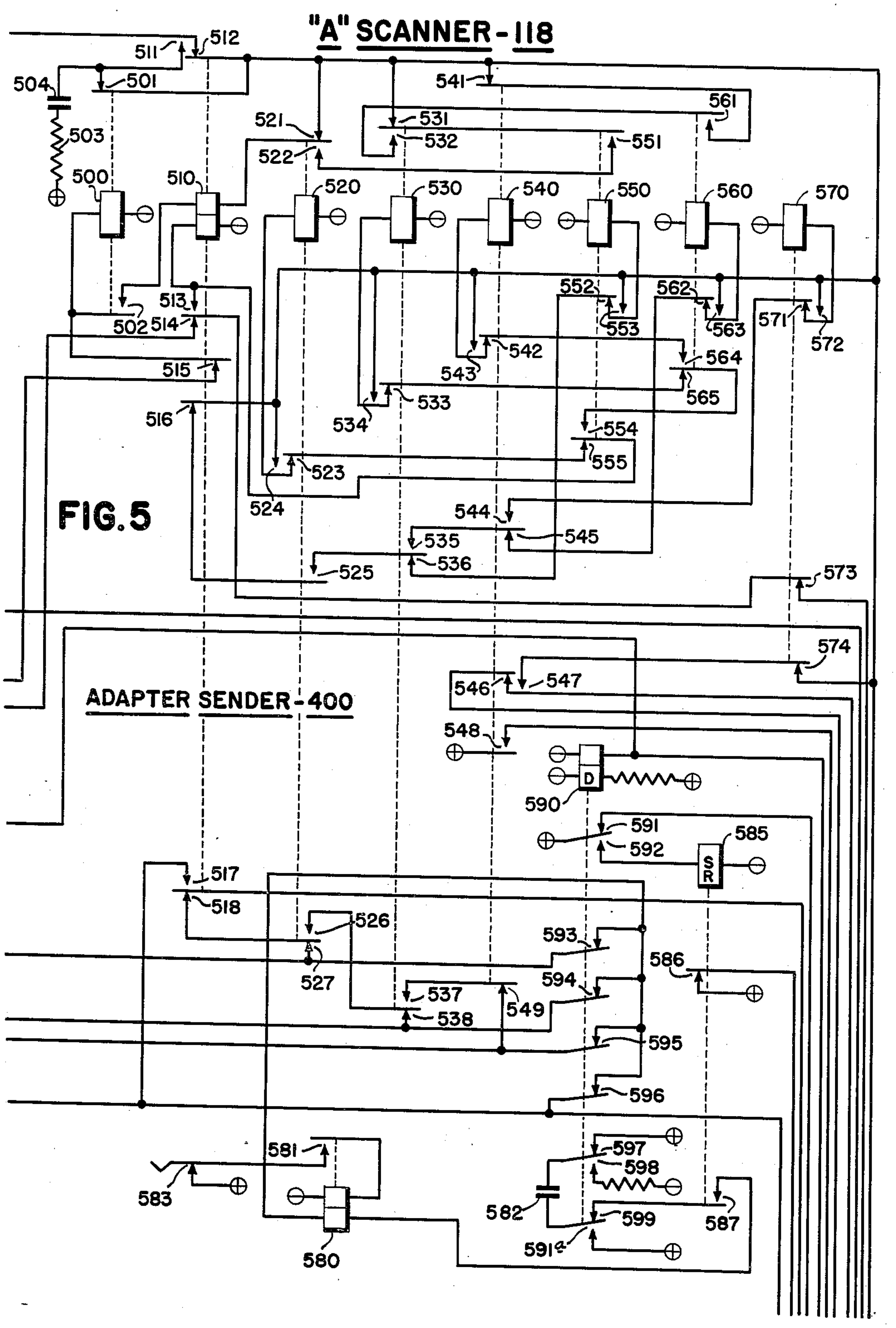

The "A" scanner 118 (FIGS. 4, 5, 8, 9, 11 and 12), which is identical to the "B" scanner or sender 120, includes a clock-calendar sender 800 (FIGS. 8, 9, 11 and 12) for supplying date and time information to an adapter recorder 110 and an adapter sender 400 (FIGS. 4 and 5) for supplying pulses to the recorder 110 representing the designation of the adapter. The clock and calendar sender 800 is controlled by the clock and calendar circuit 116 to transmit digits representing date and time by repeatedly operating a first counting circuit through successive variable length cycles of operation in accordance with the values of the date and time digits. Each of these cycles is arrested under the control of a different one of the date and time registers in the clock and calendar circuit 116 which are sequentially rendered effective by a steering circuit in the clock-calendar sender 800. The adapter sender 400 includes a second counting means operable through successive cycles of fixed length for supplying a fixed number of pulses, selected ones of which are stored in the recorder 110 in accordance with the selective interconection of the adapter identifying conductors with the conductors in the groups 496, 497 and 498.

CLOCK-CALENDAR SENDER 800

Referring now more specifically to the clock-calendar sender 800 in the "A" scanner 118, the operation of this circuit is initiated by the application of ground through the closed contacts 1001, 1031, 831 and 854 to complete an operating circuit for a start relay 840. The operation of the relay 840 closes a plurality of contacts 841—846 and 848 and opens a pair of contacts 847. The closure of the contacts 40 provides a temporary source of main ground for the sender 118. The closure of the contacts 842 prepares an operating circuit for a relay 850, and the closure of the contacts 843 provides an additional source of holding ground which is returned to the circuit 126 and the adapter circuit 108. The closure of the contacts 848 supplies ground to the upper operating winding of the differential relay 590 so that this relay releases to open the contacts 591 and a plurality of contacts 593—597 and 599 and to close a plurality of contacts 592, 598 and 591*a*.

The opening of the contacts 591 removes one source of holding ground for the circuits 108 and 126, but ground is provided for these circuits at the closed contacts 843. The opening of the contacts 593—596 interrupts portions of an operating circuit for an alarm relay 580, and the closure of the contacts 598 and 591*a* completes a charging circuit for a condenser 582. The closure of the contacts 592 completes an obvious operating circuit for a relay 585 so that this relay operates to close a pair of contacts 587 and to open the contacts 586. The opening of the contacts 586 removes ground from the pickup lead extending through the supervisory circuit 126 to the adapter 108. However, as described above, the relay 240 remains operated over local holding circuits in the adapter 108. The closure of the contacts 587 prepares a point in the operating circuit for the alarm relay 580.

Referring back to the above described operation of the start relay 840, the closure of the contacts 845 prepares an operating circuit for a relay 860. When the pulse generator 700, which has previously been placed in operation by the closure of the contacts 1005, next closes the contacts 773, ground is applied over the conductor 778 and the closed contacts 845 to complete an operating circuit for the relay 860. In operating, this relay opens the contacts 861 and 862 and closes a plurality of contacts 863, 864, 865 and 866. The closure of the contacts 864 completes a holding circuit for the relay 860 extending to ground at the closed contacts 846. The opening of the contacts 861 and 862 interrupts additional points in the above described paths for applying ground to the hold and pickup leads extending to the adapter circuit 108 and the supervisory circuit 126. The closure of the contacts 863 prepares an operating circuit for a relay 850, and the closure of the contacts 866 provides an additional source of ground for energizing the upper winding of the differential relay 590 to maintain this relay in a released condition. The closure of the contacts 865 forwards ground through a blocking rectifier to a conductor 867 which extends to the clock and calendar circuit 116. The application of ground to the conductor 867 advises the clock and calendar circuit 116 that a date and time sending operation is to be initiated and, as described in detail in the above identified copending Harris application, is used by this circuit to cause the storage of any operating pulses that are supplied to the stepping switches during this sending operation.

The ground provided by the closed contacts 865 is also forwarded through a plurality of normally closed contacts 891, 971, 941, 911, 981 and 951 to be applied to the steering conductor designated "MO." As described above, this conductor extends over the cable 1090 to the clock and calendar circuit 116 so that ground is now applied to the wiper of the stepping switch representing the value of the numerical designation of the current month. Assuming that the month during which the toll call is placed is December, which month is represented by the numerical designation "12," this ground is forwarded by the clock and calendar circuit 116 to the marking conductor designated as "12" in FIG. 11. Thus, the clock-calendar sender 800 is now conditioned to perform a digit transmitting operation in which twelve mark pulses representing the month designation are transmitted to and stored in the adapter recorder 110, the group of mark pulses being followed by a space pulse to separate this first group of mark pulses in the date and time information from succeeding groups of mark pulses.

Referring back to the operation of the relay 860 to close the contacts 863, when the relay 770 in the pulse generator 700 is next operated to open the contacts 773 and 774 and to close the contacts 771 and 772, ground is removed from the conductor 778, but the relay 860 remains operated over the above described holding circuit. The closure of the contacts 771 applies ground to the pulsing conductor 775, and this ground is forwarded through the closed contacts 842 and 863 to operate the relay 850. In operating, the relay 850 closes a plurality of contacts 851, 852, 853, 855, 856, 858, 859 and 851*a* and opens the contacts 854 and a pair of contacts 857. The closure of the contacts 855 completes a holding circuit for the relay 850 which extends through a pair of normally closed contacts 546 to ground at the closed contacts 844.

The closure of the contacts 853 extends ground from a pair of normally closed contacts 821 to the holding conductor for the circuits 108 and 126. The opening of the contacts 854 interrupts the above described operating circuit for the start relay 840, but this relay is slow-to-release and does not release at this time. The closure of the contacts 858 provides an additional source of holding ground for the relay 860, and the closure of the contacts 859 prepares an operating circuit for an alarm relay 820, which circuit is interrupted at the open contacts 847.

The closure of the contacts 856 completes an operating circuit for a timing relay 810 which includes a condenser 814 and a resistance element 815 connected in series with the operating winding of the relay 810 between grounded battery and ground. The relay 810 is operated by the closure of the contacts 856 to open a pair of contacts 811 and to close a plurality of contacts 812 and 813. The relay 810 remains operated until such time as the condenser 814 has been fully charged so that charging current no longer flows through the winding of the relay 810. However, the time constant of the circuit including the condenser 814, the resistance 815, and the resistance of the winding of the relay 810 is such that the relay 810 should remain operated until the completion of the sending cycle of the scanner 118. The release of the relay 810 prior to the completion of the sending operation establishes an alarm condition in the scanner circuit 118, as described in detail below.

The opening of the contacts 811 interrupts another point in the operating circuit for the alarm relay 820, and the closure of the contacts 812 provides an additional source of main ground for the sender 118. The closure of the contacts 813 completes an obvious operating circuit for a relay 830 which operates to open the contacts 831 and to close a pair of contacts 832. The opening of the contacts 831 interrupts an additional point in the operating circuit for the start relay 840, and the closure of the contacts 842 provides an additional source of holding ground for the relay 850.

After a time delay interval sufficient to insure the operation of the relay 810, the slow-to-release relay 840 releases to restore its contacts to a normal condition. The opening of the contacts 842 interrupts the above described operating circuit for the relay 850, but this relay remains operated over the holding circuit completed by the closure of the contacts 855. The closure of the contacts 847 prepares a portion of an operating circuit for the alarm relay 820, which circuit is interrupted at the open contacts 811. The remaining contact operations produced by the release of the start relay 840 merely aid in restoring the scanner circuit 118 to a normal condition.

Referring back to the above described operation of the relay 850, the closure of the contact 851, 851*a* and 852 renders the pulsing conductors 775, 776 and 778 effective to transmit pulses to the adapter 108 and to operate a plurality of relays 1100, 1110, 1120, 1130, 1140, 1150, 1160, 1170, 1200, 1210, 1220, 1230, 1240, 1250, 1260 and 1270 forming a counting chain in the clock-calendar sender 800. More specifically and as described above, the relay 850 is operated to close the contacts 851 when the relay 770 operates to close the contacts 771 so that ground is applied to the conductor 775. When the relay 770 next operates, ground is applied to the conductors 776 and 778. The ground on the conductor 776 is forwarded through the closed contacts 852 and a plurality of normally closed contacts 881, 518 and 527 and in parallel to a plurality of contacts 415, 427, 437, 447, 455 and 465. These contacts apply the ground to all of the hundreds digit identifying or pulsing conductors in the group 496. One of these conductors is strapped to each of the adapters in the "A" group so that the hundreds digit identifying conductors also serves to provide a pulsing path for transmitting the date and time information. Thus, date and time information can be concurrently transmitted to all of the calling adapter circuits in the "A" group.

As an example, the value of the hundreds digit of the designation of the adapter circuit 108 is "6" so that the ground supplied through the closed contacts 465 is forwarded over the normally closed contacts 302, the conductor 255, the closed contacts 255*a*, the diode 291, and the closed contacts 244 to the relay 230. The operation of this relay operates the second mark relay 222 so that the mark head 280 is momentarily energized to record a mark pulse on the tape in the recorder 110 and so that the advance magnet 260 is operated to advance the magnetic tape a single step.

Concurrently with recording the first mark pulse on the tape in the recorder 110, the counting circuit (FIGS. 11 and 12) is operated a single step to register the fact that one mark pulse has been transmitted. More specifically, the closure of the contacts 773 applies ground to the conductor 778 which is extended over the closed contacts 851*a* and a plurality of normally closed contacts 884, 924, 1225, 1105, 1154 and 1232 to complete an operating circuit for the first counting relay 1230. The relay 1230, in operating, opens the contacts 1232 and closes a plurality of contacts 1231, 1233, 1234 and 1235. The contacts 1232 and 1233 form a make-before-break contact arrangement so that the closure of the contacts 1233 completes a holding circuit for the relay 1230 extending to ground through a plurality of closed contacts 1103, 872 and 812 prior to the opening of the contacts 1232 to interrupt the above described operating circuit. The closure of the contacts 1234 prepares one portion of an operating circuit for the second counting relay 1110, and the closure of the contacts 1235 interconnects the "1" manifesting conductor from the clock and calendar circuit 116 through a resistor 1227 to the lower operating windings of a pair of stop relays 870 and 880. The closure of the contacts 1231 prepares an operating circuit for the first control relay 1220.

When the relay 770 next operates to open the contacts 773 and 774 and to close the contacts 771 and 772, ground is removed from the conductors 776 and 778. The removal of ground from the conductor 776 releases the relays 220 and 230 so that the advance magnet 260 is released. Thus, a single mark pulse has been recorded on the magnetic tape in the recorder 110 and the tape has been advanced a single step. The removal of ground from the conductor 778 performs no useful function inasmuch as the operating circuit for the first counting relay 1230 has previously been interrupted by the opening of the contacts 1232. The closure of the contacts 771 completes the operating circuit for the relay 1220. This circuit extends from the pulsing conductor 775 through the closed contacts 851 and 1231 and a pair of normally closed contacts 1221 to operate the relay 1220. In operating, this relay opens the contacts 1221 and 1225 and a pair of contacts 1223 and closes a plurality of contacts 1222, 1224 and 1226.

The contacts 1221 and 1222 form a make-before-break contact arrangement so that the closure of the contacts 1222 completes a holding circuit for the relay 1220 extending to ground over the closed contacts 1103, 872 and 812 prior to the opening of the contacts 1221 to interrupt the above described operating circuit. The opening of the contacts 1225 interrupts an additional portion of the above described operating circuit for the first counting relay 1220, and the concurrent closure of the contacts 1224 completes an additional portion of the operating circuit including the closed contacts 1234 for the second counting relay 1110. The closure of the contact 1226 shunts the resistor 1227 so that, if ground is applied to the "1" designating conductor by the clock and calendar circuit 116, an operating circuit is completed for the stop relays 870 and 880. However, as described above, the first item of information transmitted by the scanner 118 is the designation of the current month which is assumed to be December. Since this month is represented by the numerical designation "12," ground is not applied to the "1" manifesting conductor and the stop relays 870 and 880 are not operated.

When the relay 770 next operates to close the contacts 773 and 774, a ground pulse is transmitted over the above identified path including the conductor 776 to again operate the mark relays 220 and 230 so that a second mark pulse is recorded on the tape and so that the advance magnet 260 is again energized to operate the step-by-step drive mechanism to advance the magnetic tape a single step. Further, this next operation of the relay 770, in closing the contacts 773, applies ground to the conductor 778 which is extended over the closed contacts 851*a*, 884, 924, 1224 and 1234 and a pair of normally closed contacts 1113 to complete an operating circuit for the second counting relay 1110. This relay operates to close a plurality of contacts 1111, 1112, 1114 and 1115 and to open the contacts 1113. The contacts 1113 and 1114 form a make-before-break contact arrangement so that the closure of the contacts 1114 completes a holding circuit extending to ground at the closed contacts 812 through a plurality of contacts 872 and 1155. The closure of the contacts 1111 prepares an operating circuit for the second control relay 1100, and the closure of the contacts 1112 prepares an operating circuit for the third counting relay 1160. The closure of the contacts 1115 connects the "2" marking conductor to the operating windings of the stop relays 870 and 880 through a series resistor 1107.

When the relay 770 in the pulse generator 700 next actuates, the mark relays in the adapter circuit 108 and the advance magnet 260 in the recorder 110 are released. The closure of the contacts 771 applies ground to the conductor 775 which is extended through the closed contacts 851 and 1111 and through a pair of normally closed contacts 1101 to complete an operating circuit for the relay 1100. In operating, this relay opens the contacts 1101, 1103 and 1105 and closes a plurality of contacts 1102, 1104 and 1106. The contacts 1101 and 1102 form a make-before-break contact arrangement so that the closure of the contacts 1102 completes a holding circuit for the relay 1100 extending to ground through the closed contacts 1155 prior to the opening of the contacts 1101 to interrupt the above described operating circuit. The closure of the contacts 1104 prepares an additional portion of the operating circuit for the third counting relay 1160. The closure of the contacts 1106 places a shunt around a series resistor 1107 so that the windings of the stop relays 870 and 880 are directly connected to the "2" marking conductor, through the closed contacts 1115. However, as indicated above, this conductor is not grounded by the clock and calendar circuit 116 and the stop relays are not operated.

The opening of the contacts 1103 interrupts the above described holding circuits for the relays 1220 and 1230 so that these relays release to restore the contacts controlled thereby to their normal condition. The release of these relays disconnects the "1" marking conductor from the stop relays 870 and 880. Thus, at the completion of two cycles of operation of the pulse generator 700, two mark pulses have been recorded on the magnetic tape in the adapter recorder 110 and the counting circuit (FIGS. 11 and 12) in the clock-calendar sender 800 has been advanced two steps to a position in which the relays 1100 and 1110 are operated to signify the transmission of the two mark pulses. In this position, the "2" marking conductor is connected to the stop relays 870 and 880 to perform a test for the presence of stop ground.

When the pulse generator 700 is next operated, the mark relays 220 and 230 in the adapter circuit 108 are operated and released to record a mark pulse on the magnetic tape in the recorder 110 and to operate the step drive mechanism to advance the magnetic tape a single step following the recording of the third mark pulse. This operation of the pulse generator 700 also advances the counting circuit in the sender 800 to a position in which the third counting relay 1160 and the third control relay 1150 are operated to interconnect the "3" marking conductor from the clock-calendar circuit 116 with the stop relays 870 and 880.

More specifically, when ground is applied to the conductor 778 by the pulse generator 700, this ground is forwarded over the above described circuit and through the closed contacts 1104 and 1112 and through a pair of normally closed contacts 1163 to complete an operating circuit for the relay 1160 so that this relay operates to close a plurality of contacts 1161, 1162, 1164 and 1165 and to open the contacts 1163. The contacts 1163 and 1164 form a make-before-break contact arrangement so that the closure of the contacts 1164 completes a holding circuit for the relay 1160 extending to ground through the closed contacts 1223 prior to the opening of the contacts 1163 to interrupt the above described operating circuit. The closure of the contacts 1161 prepares an operating circuit for the relay 1150, and the closure of the contacts 1162 prepares an operating circuit for the fourth counting relay 1240. The closure of the contacts 1165 connects the "3" marking conductor with the lower operating windings of the stop relays 870 and 880 through a series resistor 1157.

When the pulse generator 700 removes ground from the conductors 776 and 778 and applies it to the conductor 775, this ground is extended through the closed contacts 1161 and a pair of normally closed contacts 1151 to operate the relay 1150. In operating, this relay opens the contacts 1151, 1154 and 1155 and closes a plurality of contacts 1152, 1153 and 1156. The contacts 1151 and 1152 form a make-before-break contact arrangement so that the closure of the contacts 1152 completes a holding circuit extending to ground through the closed contacts 1223 prior to the opening of the contacts 1151 to interrupt the above described operating circuit. The closure of the contacts 1153 prepares an additional portion of the operating circuit including the closed contacts 1162 for operating the fourth counting relay 1240. The closure of the contacts 1156 provides a shunt around the series resistor 1157 so that the "3" marking conductor is directly connected to the lower windings of the stop relays 870 and 880. The opening of the contacts 1155 interrupts the above described holding circuit for the operated relays 1100 and 1110 so that these relays restore to their normal conditions, thus disconnecting the "2" marking conductor from the test relays 870 and 880.

Figure 11:
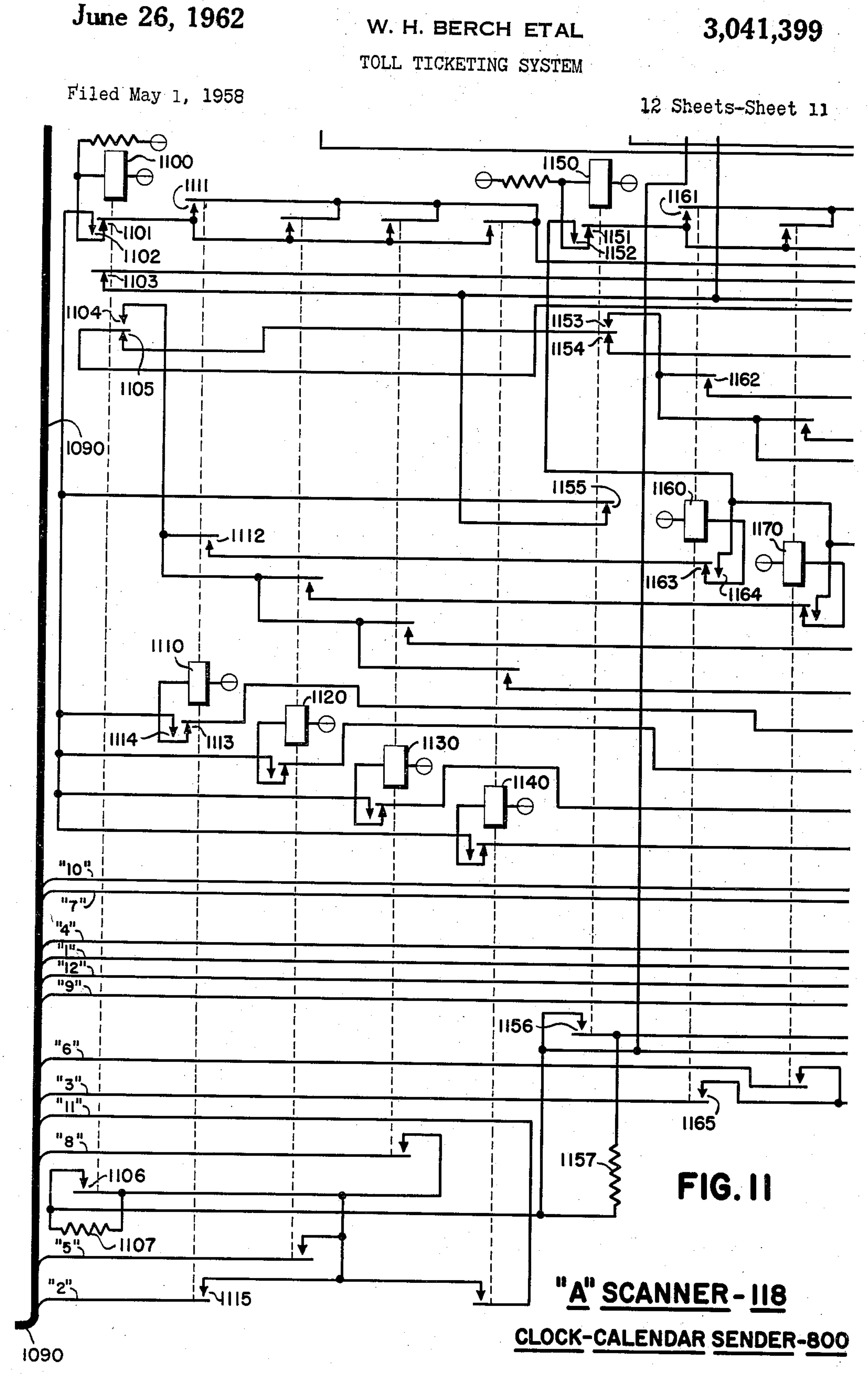
Figure 12:
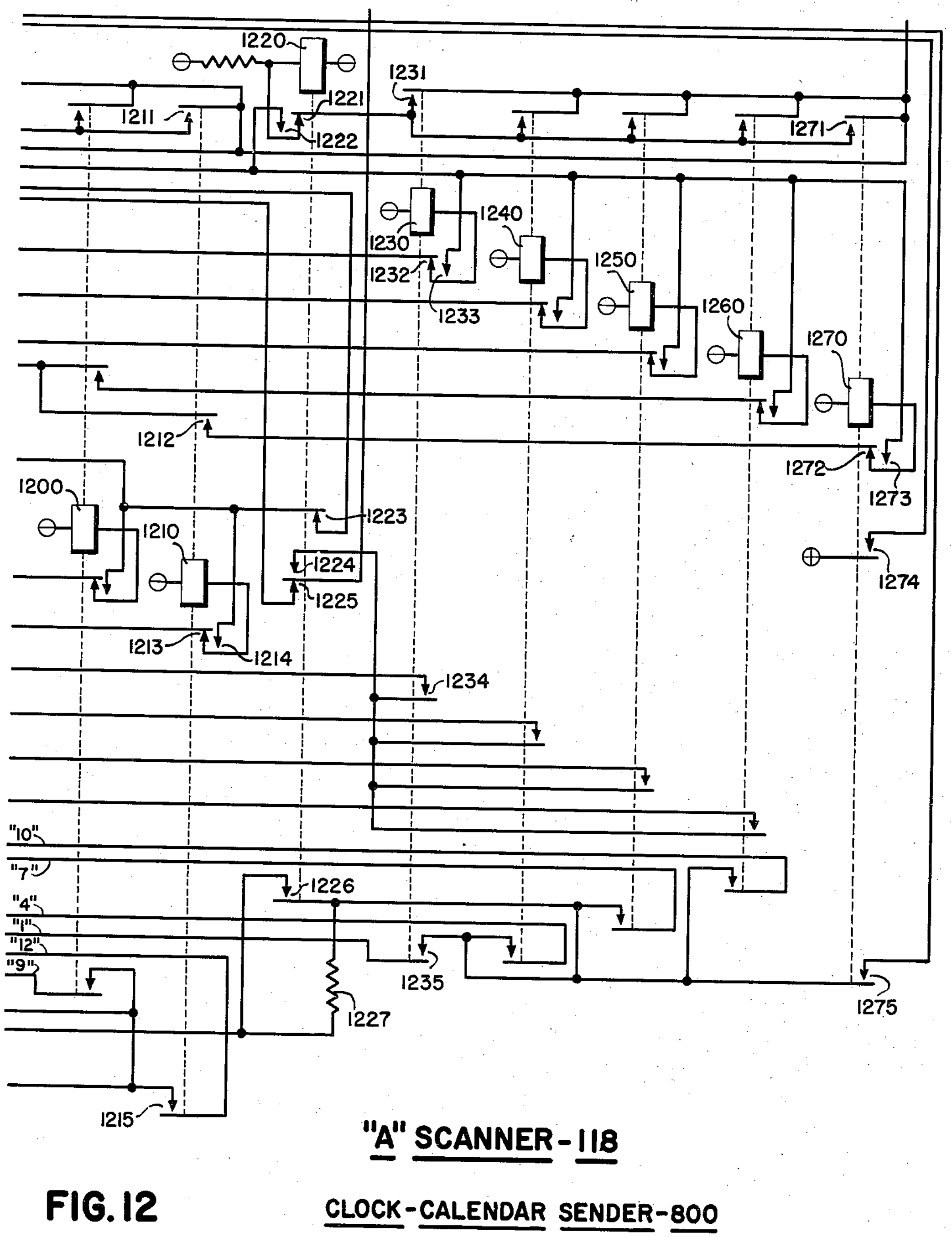

Accordingly, it is clear that each operation of the pulse generator 700 results in the recording of a mark pulse on the magnetic tape in all of the effective adapter recorders, such as the recorder 110, and that, concurrently with the recording with each of these signals, the counting circuit shown in FIGS. 11 and 12 of the drawings is advanced a single step so that each of the digit marking conductors from the clock and calendar circuit 116 is connected in turn to the operating windings of the test or stop relays 870 and 880. Since the counting circuit shown in FIGS. 11 and 12 and the mark pulse recording and magnetic tape advancing means operate in a similar manner during continuing cycles of operation of the pulse generator 700, during which the first group of mark pulses representing the value of the months notation is being stored in the recorder 110, a detailed description of this operation is not set forth herein. However, the following table sets forth the designations of the relays in the counting circuit that are operated by each successive pulse supplied by the generator 700 together with the one of the digit marking conductors from the clock and calendar circuit 116 that is connected to the windings of the stop relays 870 and 880.

Figure 10:
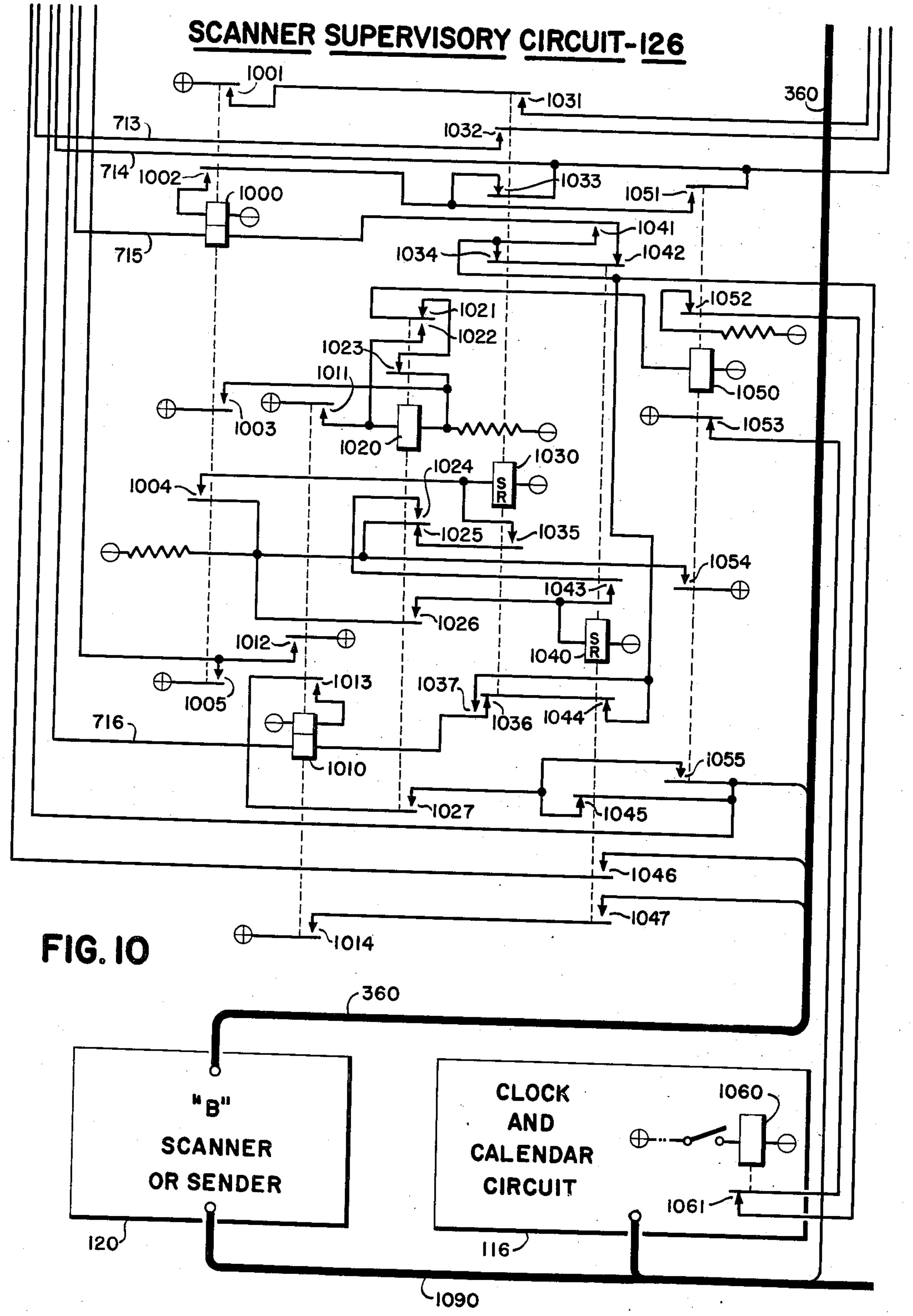

| Number of Pulses Supplied by the Generator 700 | Operated Relays in the Counting Circuit in FIGS. 10 and 11 | Designation of the marking Conductor Connected to the Relays 870 and 880 |
|---|---|---|
| 1 | 1220 and 1230 | "1" |
| 2 | 1100 and 1110 | "2" |
| 3 | 1150 and 1160 | "3" |
| 4 | 1220 and 1240 | "4" |
| 5 | 1100 and 1120 | "5" |
| 6 | 1150 and 1170 | "6" |
| 7 | 1220 and 1250 | "7" |
| 8 | 1100 and 1130 | "8" |
| 9 | 1150 and 1200 | "9" |
| 10 | 1220 and 1260 | "10" |
| 11 | 1100 and 1140 | "11" |
| 12 | 1150 and 1210 | "12" |
| 13 | 1220 and 1270 | |

Accordingly, at the end of the twelfth cycle of operation of the pulse generator 700, twelve mark pulses representing the numerical designation "12" of the month of December have been recorded on the magnetic tape in the adapter recorder 110 and this magnetic tape has been advanced twelve steps. As indicated in the table above, the relays 1150, and 1210 are now in an operated condition. The relay 1210, in operating, closes a plurality of contacts 1211, 1212, 1214 and 1215 and opens a pair of contacts 1213. The contacts 1213 and 1214 interrupt the operating circuit for the relay 1210 and complete a holding circuit for this relay which extends to ground through the closed contacts 1223. The closure of the contacts 1211 prepares the operating circuit for the relay 1150 so that this relay is operated during this twelfth cycle of operation. The closure of the contacts 1212 prepares an operating circuit for a thirteenth counting relay 1270. The closure of the contacts 1215 together with the closure of the contacts 1156 when the relay 1150 is operated over the circuit including the closed contacts 1211 and 1151 during the twelfth cycle of operation of the pulse generator 700, prepares a circuit for extending the ground applied to the "12" marking conductor directly to the lower operating windings of the stop relays 870 and 880 so that these relays operate.

The operation of the relay 880 opens the contacts 881 and 884 and closes a plurality of contacts 882 and 883. The opening of the contacts 881 prevents the application of operating pulses to the path extending to the adapter circuit 108, thereby to prevent the recording of a mark pulse on the magnetic tape during the next cycle of operation of the pulse generator 700. The opening of the contacts 884 interrupts a point in the above described circuit for supplying operating signals from the pulsing conductor 778 to the counting circuit shown in FIGS. 11 and 12 so as to prevent further operation of this circuit at this time. The closure of the contacts 883 prepares a circuit including a diode 885 for extending the ground pulse supplied to the pulsing conductor 778 to the upper windings of the relays 870 and 880, thereby to hold these relays operated during the subsequent cycle of operation of the pulse generator 700. The closure of the contacts 882 prepares a circuit for transmitting a space pulse to the adapter circuits 108.

In operating, the relay 870 closes a plurality of contacts 871, 873 and 874 and opens the contacts 872 and 875. The contacts 871 and 872 form a make-before-break contact arrangement so that the closure of the contacts 871 completes a holding circuit extending to the closed contacts 771 for maintaining the relays 1150 and 1210 operated when the contacts 872 open to interrupt the above described holding circuit for all of the relays in the counting circuit shown in FIGS. 11 and 12. The closure of the contacts 873 provides a shunt around the normally closed contacts 891 so as to maintain ground on the "12" designated marking conductor. The closure of the contacts 874 completes an operating circuit for a first steering relay 900 extending from ground through the closed contacts 812 and 874 and a plurality of normally closed contacts 904, 961 and 934.

In operating, the relay 890 opens the contacts 891 and closes a plurality of contacts 892, 893, 894 and 895. The closure of the contacts 893 completes a holding circuit for the relay 890 extending to ground through a pair of normally closed contacts 863 and the closed contacts 812. The closure of the contacts 894 prepares an operating circuit for a second steering relay 970, and the closure of the contacts 895 prepares an operating circuit for a relay 900. The opening of the contacts 891 removes the ground extended to the wiper of the months stepping switch in the clock and calendar circuit 116, but ground is maintained thereon by the closed contacts 873. The closure of the contacts 892 forwards ground from the closed contacts 865 to the steering conductor "DT" so that ground is now forwarded over the wiper of the tens days register switch to one of the marking conductors in accordance with the value of the tens days digit. Accordingly, the operation of the first steering relay 890 interrupts the previously established circuit for forwarding marking ground to the months register switch in the clock and calendar circuit 116 and completes a circuit for extending marking ground to the tens days register switch in the circuit 116, thereby to condition the counting circuit shown in FIGS. 11 and 12 for a cycle of operation in which the value of the tens days digit is transmitted to and stored in the adapter recorder 110.

When the pulse generator 700 next operates to open the contacts 771 and to close the contacts 773 and 774, the opening of the contacts 771 removes the holding ground forwarded through the closed contacts 871 to maintain the relays 1150 and 1210 in the counting circuit in an operated condition. Accordingly, these relays now release to interrupt the above described circuit for operating the stop relays 870 and 880. However, the concurrent closure of the contacts 773 to ground the pulsing conductor 778 completes a circuit extending through the closed contacts 851a and 883 and the blocking diode 884 to hold the relays 870 and 880 in an operated condition. The closure of the contacts 774 supplies ground to the pulsing conductor 776 which is forwarded through the closed contacts 882 and 312, the conductor 254, the cable 295, the closed contacts 254a, the diode 290 and the closed contacts 243 to operate the first space relay 210. The operation of the relay 210 operates the relay 200 so that the space head 270 is momentarily energized to record a space pulse on the space channel immediately following the group of mark pulses representing the numerical designation of the month in which the toll call was placed. The operation of the relays 210 and 200 further operates the advance magnet 260 so that the step drive mechanism for the tape in the adapter recorder 110 advances the magnetic tape a single step following the recording of the space signal.

When the pulse generator 700 next operates to open the contacts 773 and 774 and to close the contacts 771, the opening of the contacts 774 removes ground from the pulsing conductor 776 so that the above described operating circuit for the space relay 210 is opened. This relay releases to release the relay 200 so that the advance magnet 260 is released. The opening of the contacts 773 removes ground from the pulsing conductor 778 so that the holding circuit for the stop relays 870 and 880 is interrupted to release these relays. In releasing, the relay 880 closes the contacts 881 and 884 and opens the contacts 882 and 883. The closure of the contacts 881 reestablishes the above described path for supplying mark pulses to the first mark pulse relay 230, and the opening of the contacts 882 interrupts the above described circuit for operating the space relay 210. The opening of the contacts 883 interrupts an additional point in the holding circuit for the stop relays 870 and 880, and the closure of the contacts 884 prepares the above identified path for supplying operating pulses to the counting circuit.

The release of the relay 870 closes the contacts 872 and 875 and opens the contacts 871, 873 and 874. The opening of the contacts 873 removes the ground applied to the wiper in the months register circuit so that ground is now forwarded only through the closed contacts 892 to the "DT" steering conductor and accordingly to the wiper of the tens days register switch in the clock and calendar circuit 116. The closure of the contacts 872 reestablishes a source of holding ground for the counting circuit to permit an additional cycle of operation thereof. The opening of the contacts 874 interrupts the above described operating circuit for the first steering relay 890, but this relay remains operated over the holding circuit completed through the closed contacts 893. The closure of the contacts 875 completes an operating circuit for the relay 900 which extends from ground through the closed contacts 812, 875 and 895 and a pair of normally closed contacts 902.

In operating, the relay 900 opens the contacts 902 and 904 and a pair of contacts 905 and closes a plurality of contacts 901 and 903. The contacts 901 and 902 form a make-before-break contact arrangement so that the closure of the contacts 901 completes a holding circuit for the relay 900 extending to ground at the closed contacts 812 through the normally closed contact 963 prior to the opening of the contacts 902 to interrupt the above described operating circuit. The closure of the contacts 903 prepares an additional portion of the operating circuit for the second steering relay 970, and the opening of the contacts 904 interrupts an additional point in the above described operating circuit for the first steering relay 890.

The clock and calendar sender 800 in the "A" scanner 118 is now operated by the pulse generator 700 under the control of the counting circuit in the manner described above so that a group of mark pulses representing the value of the tens days digit is transmitted to and stored in the adapter recorder 110 in the manner described above. When ground is encountered on one of the marking conductors extending to the clock and calendar circuit 116, the stop relays 870 and 880 are again operated to record a space pulse on the magnetic tape in the recorder 110 immediately following the group of digits representing the value of the tens days digits, and the counting circuit is restored to a normal condition. Further, when the relay 870 is operated to close the contacts 874 ground is extended through the closed contacts 874, 903 and 894 to operate the second steering relay 970 so that this relay opens the contacts 971 and closes a plurality of contacts 972, 973, 974 and 975. The closure of the contacts 974 completes a holding circuit for the relay 970 extending to ground through a pair of normally closed contacts 935 and the contacts 812. The closure of the contacts 973 prepares an operating circuit for a third steering relay 940, and the closure of the contacts 975 prepares an operating circuit for a relay 960. The closure of the contacts 972, together with the prior closure of the contacts 873, forwards ground to the steering conductor "DU" so that ground is now applied to the numerical marking conductors controlled by the clock and calendar circuit 116 in accordance with the value of the units days digit.

When the relays 870 and 880 release to condition the circuit for transmitting a group of mark pulses representing the value of the units days digit, the closure of the contacts 875 forwards ground through the closed contacts 975 and a pair of normally closed contacts 964 to operate the relay 960. In operating, this relay opens the contacts 961, 963 and 964 and closes a plurality of contacts 962 and 965. The contacts 964 and 965 form a make-before-break contact arrangement for completing a holding circuit for the relay 960 extending to ground through the closed contacts 935 prior to the opening of the contacts 964. The closure of the contacts 962 prepares an additional portion of the operating circuit for the third steering relay 940, and the opening of the contacts 963 interrupts the above described holding circuits for the first steering relay 890 and the control relay 900 so that these relays release to restore their contacts to a normal position. The closure of the contacts 891 shunts the open contacts 873 to forward ground to the "DU" steering conductor.

The pulse generator 700 then operates the clock-calendar sender 800 to store a group of mark pulses in the recorder 110 representing the value of the units days digit and, at the end of this cycle of operation, operates the stop relays 870 and 880 to record a space pulse on the tape in the recorder 110 following the group of mark pulses representing the value of the units days digit. In operating, the relays 870 and 880 complete the operating circuit for the third steering relay 940 which extends through the closed contacts 973, 962, 904 and 874 to ground at the closed contacts 812. In operating, the relay 940 opens the contacts 941 and closes a plurality of contacts 942—945. The closure of the contacts 943 completes a holding circuit for the relay 940 extending to ground through the closed contacts 905 and 812. The closure of the contacts 945 prepares an operating circuit for a control relay 930, and the closure of the contacts 944 prepares an operating circuit for a fourth steering relay 910. The closure of the contacts 942 prepares a circuit for extending marking ground to the steering conductor "HT," which circuit is interrupted at the open contacts 971.

Thus, when the relays 870 and 880 restore to again close the contacts 875, ground is forwarded through the contacts 875 and 945 and a pair of normally closed contacts 931 to operate the control relay 930. In operating, this relay opens the contacts 931, 934 and 935 and closes a plurality of contacts 932 and 933. The contacts 931 and 932 form a make-before-break contact arrangement which establishes a holding circuit for the relay 930 extending to ground through the closed contacts 905 prior to the opening of the contacts 931 to interrupt the above described operating circuit. The closure of the contacts 933 prepares an additional portion of the operating circuit for the fourth steering relay 910. The opening of the contacts 935 interrupts the above described holding circuits for the second steering relay 980 and the control relay 960 so that these relays restore to their normal condition. The release of the relay 970, in closing the contacts 971, extends the ground provided at the closed contacts 891 through the closed contacts 942 to the steering conductor "HT." This ground is forwarded through the clock and calendar circuit 116 to one of the digit marking conductors in accordance with the value of the tens hours digit, thereby conditioning the sender 800 for transmitting a group of mark pulses representing the value of this digit during its next cycle of operation under the control of the pulse generator 700.

The sender 800 is now operated by the pulse generator 700 to transmit a group of mark pulses representing the value of the tens hours digit for storage in the adapter recorder 110 in the manner described in detail above. At the completion of this sending operation, as determined by the connection of the stop relays 870 and 880 to a grounded one of marking conductors, these relays are operated to record a space pulse on the magnetic tape following the group of mark pulses representing the values of the tens hours digit. In operating, the relay 870 closes the contacts 874 to forward ground through the closed contacts 904, 961, 933 and 944 to complete an operating circuit for the fourth steering relay 910. This relay operates to close a plurality of contacts 912—915 and to open the contacts 911.

The closure of the contacts 913 completes a holding circuit for the relay 910 extending to ground through the closed contacts 963 and 812. The closure of the contacts 915 prepares an operating circuit for the relay 900, and the closure of the contacts 914 prepares an operating circuit for a fifth steering relay 980. The closure of the contacts 912 prepares a circuit for applying ground to the steering conductor "HU." When the relay 870 is next released to close the contacts 875, ground is forwarded through the closed contacts 915 and 902 to again operate the relay 900. In operating, this relay closes the contacts 901 and 903 and opens the contacts 902, 904 and 905. The operation of the contacts 901 and 902 again completes a holding circuit for the relay 900 extending to ground through the closed contacts 963 and 812. The closure of the contacts 903 prepares an additional portion of the operating circuit for the fifth steering relay 980, and the opening of the contacts 905 interrupts the holding circuit for the third steering relay 940 and the relay 930 so that these relays release.

The release of the relay 940 forwards ground from the closed contacts 891 through the closed contacts 971, 941 and 912 to the steering conductor "HU." The application of ground to this steering conductor conditions the clock and calendar circuit 116 to apply marking ground to one of the digit marking conductors in accordance with the value of the units hours digit. Thus, during the succeeding cycle of operation of the counting circuit in the clock-calendar sender 800, a group of mark pulses are transmitted to and stored in the recorder 110 in accordance with the value of the units hours digit. At the end of this cycle of operation, the relays 870 and 880 are again operated to record a space pulse on the magnetic tape and to close the contacts 874.

The closure of the contacts 874 completes the prepared operating circuit for the fifth steering relay 980 so that this relay operates to open the contacts 981 and to close a plurality of contacts 982—985. The closure of the contacts 984 completes a holding circuit for the relay 980 extending to ground through the closed contacts 935, and the closure of the contacts 983 prepares an operating circuit for a sixth steering relay 950. The closure of the contacts 985 prepares an operating circuit for the control relay 960, and the closure of the contacts 982 prepares a circuit for forwarding ground to the steering conductor "MT."

When the relay 870 is released to close the contacts 875, ground is forwarded through the closed contacts 985 and 964 to operate the relay 960. In operating, this relay opens the contacts 961, 963 and 964 and closes the contacts 962 and 965. The contacts 965 complete a holding circuit for the relay 960 extending to ground through the closed contacts 935. The closure of the contacts 962 prepares an additional portion of the operating circuit for the sixth steering relay 950, and the opening of the contacts 963 interrupts the holding circuit for the relays 900 and 910 so that these relays release. In releasing, the relay 910 closes the contacts 911 so that ground is forwarded over the closed contacts 891, 971, 941, 911 and 982 to the "MT" steering conductor.

The application of ground to this steering conductor conditions the clock and calendar circuit 116 to supply ground to the numerical marking conductor representing the value of the tens minutes digit. Thus, during the next cycle of operation of the sender 800, a group of mark pulses is transmitted to and stored in the adapter recorder 110 representing the value of the tens minutes digit. At the conclusion of this sending operation, the relays 870 and 880 are again operated to record a space pulse on the magnetic tape. Further, in operating, the relay 870 closes the contacts 874 to complete the above described operating circuit for the sixth steering relay 950.

The relay 950, in operating, opens the contacts 951 and closes a plurality of contacts 952—955. The closure of the contacts 953 completes a holding circuit for the relay 950 extending to ground through the closed contacts 905 and 812. The closure of the contacts 954 prepares a portion of an operating circuit for a seventh steering relay 920, and the closure of the contacts 955 prepares a portion of an operating circuit for the control relay 930. The closure of the contacts 952 prepares a circuit for applying ground to the steering conductor "MU."

When the relays 870 and 880 release to close the contacts 875, ground is forwarded through the closed contacts 955 and 931 to operate the relay 930. In operating, this relay opens the contacts 931, 934, 935 and closes the contacts 932 and 933. The contacts 931 and 932 interrupt the above described operating circuit for the relay 930 and also complete a holding circuit for this relay extending to ground through the closed contacts 905. The closure of the contacts 933 prepares an additional portion of the operating circuit for the seventh steering relay 920, and the opening of the contacts 935 interrupts the holding circuit for the fifth steering relay 980 and the control relay 960 so that these relays restore to their normal condition. The relay 980, in releasing to close the contacts 981, completes the circuit for forwarding ground through the closed contacts 952 to the "MU" steering conductor. The clock and calendar circuit 116 is now conditioned to supply ground to one of the numerical marking conductors extending to the counting circuit in the sender 800 in accordance with the value of the units minutes digit.

The sender 800 is operated under the control of the pulse generator 700 to supply a group of mark pulses for storage in the recorder 110 in accordance with the value of the units minutes digit. At the end of this sending operation, as determined by the detection of ground on one of the numerical marking conductors, the stop relays 870 and 880 are again operated. In operating, these relays again record a space pulse on the magnetic tape in the adapter recorder 110 immediately following the group of mark pulses representing the value of the units minutes digit. Further, in operating, the relay 870 closes the contacts 874 to complete the above described operating circuit for the seventh steering relay 920.

The relay 920, in operating, closes a plurality of contacts 921, 922 and 923 and opens the contacts 924. The closure of the contacts 921 completes a holding circuit for the relay 920 extending directly to ground at the closed contacts 812. The closure of the contacts 922 prepares an operating circuit for the control relay 900. The opening of the contacts 924 interrupts the circuit by which pulses from the pulsing conductor 778 are applied to the counting circuit in the clock-calendar sender 800 and, accordingly, terminates operation of this circuit under the control of the pulse generator 700 since all of the date and time information has now been transmitted. The closure of the contacts 923 connects the pulsing conductor 778 to the adapter sender 400, which also forms a part of the "A" scanner 118 and which is effective at the completion of the transmission of the date and time information to supply groups of mark pulses separated by space pulses to the adapter recorder 110 representing the value of the digits forming the designation of the adapter 108. However, it should be noted that the path from the pulsing conductor 778 is interrupted at the contacts 884 at this time. The contacts 883 forward the ground provided on the conductor 778 to the upper windings of the stop relays 870 and 880 to maintain these relays operated when the counting circuit is restored to its normal condition by the removal of ground from the pulsing conductor 775.

When the pulse generator 700 next operates to remove ground from the conductors 776 and 778, the holding circuit for the relays 870 and 880 is opened so that the relay 870 releases to again close the contacts 875. This forwards ground from the closed contacts 812 through the closed contacts 922 and 902 to operate the control relay 900. In operating, this relay opens the contacts 902, 904 and 905 and closes the contacts 901 and 903. The contacts 901 and 902 again complete a holding circuit for the relay 900 extending to ground through the closed contacts 963 and 812. The opening of the contacts 905 interrupts the holding circuit for the sixth steering relay 950 and the control relay 930 so that these relays restore to a normal condition. The release of these relays merely aids in restoring the clock-calendar sender 800 in the "A" scanner 118 to a normal condition.

ADAPTER SCANNER 400

After the date and time information has been transmitted, the adapter sender 400 (FIGS. 4 and 5) is operated by the pulse generator 700 to supply three successive groups of mark pulses representing the values of the hundreds, tens and units digits of the adapter designations. The sender 400 concurrently transmits these signals to all of the effective adapter circuits, and since the designations are all different, different pulse trains are supplied to each of the effective adapters in accordance with their designations. As an example, the adapter 108 is designated as "631" so that three groups of mark pulses containing six, three, and one mark pulses, respectively, are stored on the tape of the recorder 110.

When the pulse generator 700 next applies ground to the conductors 776 and 778, the ground on the conductor 778 is forwarded through the contacts **851*a*, 884 and 923 and thence through a plurality of normally closed contacts 573, 514, 464, 454, 446, 436, 526, 414 and 472 to complete an operating circuit for a relay 470. The relay 470, in operating, opens the contacts 472 and a pair of contacts 471 and closes a plurality of contacts 473 and 474. The contacts 472 and 473 form a make-before-break contact arrangement so that the closure of the contacts 473 completes a holding circuit for the relay 470 extending to ground through a plurality of normally closed contacts 481, 512 and 812 prior to the opening of the contacts 472 to interrupt the above described operating circuit. The closure of the contacts 474 prepares an operating circuit for a relay 410**.

The ground concurrently applied to the conductor 776 by the pulse generator 700 is extended through the closed contacts 852, 881, 518 and 527 to the six hundreds digit identifying conductors in the group 496 over the closed contacts 415, 427, 437, 447, 455 and 465. This ground is then extended through the normally closed contacts on the relays 300 and 310 in the supervisory circuit 126 to the leads which are strapped to the adapter circuits in the "A" group. As described above, this ground is supplied over the cable 295, the conductor 255, the closed contacts 255a, the diode 291 and the closed contacts 244 to operate the mark relay 230. The operation of the mark relay 230 and, consequently, of the second mark relay 220 momentarily energizes the mark pulse transducing head 280 to record the first mark pulse in the group of mark pulses representing the value of the hundreds digit of the adapter 108. Further, the operation of the relays 210 and 230 operates the advance magnet 260 in the step-by-step drive mechanism to advance the magnetic tape a single step following the recording of this first mark pulse.

When the pulse generator 700 next operates to remove ground from the conductors 776 and 778 and to apply ground to the conductor 775, the removal of ground from the conductor 776 interrupts the above described operating circuit for the mark relays 230 and 220 so that these relays release to release the advance magnet 260. The ground applied to the pulsing conductors 775 is extended over the closed contacts 851 and 474 and a plurality of normally closed contacts 424 and 411 to complete an operating circuit for a first counting relay 410. The operation of the relay 410 opens the contacts 411, 414 and 415 and a plurality of normally closed contacts 416 and 417 and closes a plurality of contacts 412 and 413. The contacts 411 and 412 form a make-before-break contact arrangement so that the closure of the contacts 412 completes a holding circuit for the relay 410 extending to ground through the closed contacts 512 and 812 prior to the opening of the contacts 411 to interrupt the above described operating circuit. The closure of the contacts 413 prepares an operating circuit for a second control relay 480, and the opening of the contacts 414 interrupts an additional point in the operating circuit for the control relay 470. The opening of the contacts 415, 416 and 417 disconnects the hundreds, tens and units digit "1" pulsing conductors extending to the adapter circuits in the "A" group from the pulse generator 700. However, since the hundreds digits of the designation of the identifier 108 is "6," the pulsing circuit for the mark relay remains intact through the closed contacts 465.

When the pulse generator 700 next operates to remove ground from the conductor 775 and to apply ground to the conductors 776 and 778, the ground on the conductor 776 is forwarded over the above described circuit to the six parallel paths controlled by the contacts 415, 427, 437, 447, 455, and 465. This ground pulse is supplied through the closed contacts 465 and 302 to the conductor 255, thereby operating this relay and the second mark relay 220 so that a second mark pulse is recorded on the tape in the adapter recorder 110 and so that the advance magnet 260 is operated to advance the magnetic tape a single step following recording of this second mark pulse. Similarly, the ground pulse provided on the conductor 776 is forwarded through the closed contacts 427, 437, 447 and 455 to provide a second mark pulse for all of the seized adapters having a hundreds digit of a value of "2," "3," "4," or "5," respectively. However, due to the opening of the contacts 415, a second mark pulse is not recorded on the magnetic tapes of those adapters in the "A" group having a hundreds digit "1." Thus, the magnetic tape in these adapter circuits remains in a condition with a single mark pulse recorded thereon.

The ground concurrently applied to the conductor 778 is supplied through the closed contacts 851a, 884, 923, 573, 514, 464, 454, 446, 436, 426, 413 and 414 and a pair of normally closed contacts 482 to operate a second control relay 480. This relay, in operating, opens the contacts 481 and 482 and closes a plurality of contacts 483 and 484. The contacts 482 and 483 form a make-before-break contact arrangement so that the closure of the contacts 483 completes a holding circuit for the relay 480 extending to ground through a pair of normally closed contacts 491 and the closed contacts 512 and 812 prior to the opening of the contacts 482 to interrupt the above described operating circuit. The closure of the contacts 484 prepares a portion of an operating circuit for a second counting relay 420 in the counting circuit in the adapter sender 400. The opening of the contacts 481 interrupts the above described holding circuit for the control relay 470 so that this relay releases to restore the contacts controlled thereby to a normal condition.

When the pulse generator 700 next operates, ground is removed from the conductors 776 and 778 to release the operated mark relays in any of the adapter circuits having a hundreds digit of a value in the range from "2" to "6" and thus releases the advance magnets therein. The ground applied to the conductor 775 is forwarded through the closed contacts 851 and 484 and a plurality of normally closed contacts 434 and 421 to complete the operating circuit for the second counting relay 420. In operating, the relay 420 opens the contacts 421, 424, 426, 427, 428 and 429 and closes a plurality of contacts 422, 423 and 425. The contacts 421 and 422 form a make-before-break contact arrangement so that the closure of the contacts 422 completes a holding circuit for the second counting relay 420 which is similar to that provided for the first counting relay 410 prior to the opening of the contacts 421 to interrupt the operating circuit for the second counting relay 420. The closure of the contacts 423 prepares an operating circuit for a fourth counting relay 440, and the closure of the contacts 425 prepares an operating circuit for a third control relay 490. The opening of the contacts 427, 428 and 429 disconnects the pulsing conductor 776 from those leads extending to the adapters in the "A" group which represent the hundreds, tens and units digit "2." Since only the hundreds conductors are now effective to receive pulses from the conductor 776, only two mark pulses can be recorded on the magnetic tape in the adapter recorders connected to the adapter circuits having a hundreds digit "2."

When the pulse generator 700 next operates, ground is removed from the conductor 775 and is applied to the pulsing conductors 776 and 778. The ground pulse applied to the conductor 776 causes the recording of a third mark pulse on the magnetic tapes in the adapter recorders connected to the adapter circuits having a hundreds digit of a value of "3" or greater. The ground applied to the conductor 778 is forwarded over the above described path and through the closed contacts 425 and a pair of normally closed contacts 492 to complete an operating circuit for the third control relay 490. In operating, this relay opens the contacts 491 and 492 and closes a plurality of contacts 493 and 494. The contacts 492 and 493 form a make-before-break contact arrangement so that a holding circuit is completed by the closure of the contacts 493 extending to ground through the closed contacts 471, 512, and 812 prior to the opening of the contacts 492 to interrupt the above described operating circuit. The closure of the contacts 494 prepares an operating circuit for a third counting relay 430. The opening of the contacts 491 interrupts the holding circuit for the second control relay 480 so that this relay releases to restore the contacts controlled thereby to their normal position.

When the pulse generator 700 next operates, the mark relays in the adapter circuits having an adapter identification hundreds digit of a value of "3" or greater are released, and the magnetic tapes in the associated adapter recorders are advanced a single step. The ground applied to the conductor 775 is forwarded through the closed contacts 494 and a plurality of normally closed contacts 444 and 431 to complete an operating circuit for the third counting relay 430. In operating, this relay opens the contacts 431, 434, 436, 437, 438 and 439 and closes a plurality of contacts 432, 433 and 435. The contacts 431 and 432 form a make-before-break contact arrangement to provide a holding circuit for the relay 430 similar to that provided for the first and second counting relays 410 and 420. The closure of the contacts 433 prepares a portion of an operating circuit for a fifth counting relay 450. The closure of the contacts 435 prepares a portion of an operating circuit for the first control relay 470. The opening of the contacts 437—439 interrupts the paths extending to the hundreds, tens and units digit "3" conductors extending to the adapters in the "A" group, thereby to prevent the application of additional mark pulses to the adapters having a hundreds designation digit of a value of "3."

When the pulse generator 700 next operates, the ground applied to the pulsing conductor 776 records a fourth mark pulse on the magnetic tape in the adapters having a hundreds digit designation of a value of "4" or greater, and the ground applied to the conductor 778 is extended over the above described path to and through the closed contacts 435 and 472 to again operate the first control relay 470. In operating, this relay again completes a holding circuit at the contacts 473 and prepares, at the closed contacts 474, an additional portion of the operating circuit for the fourth counting relay 440. The opening of the contacts 471 interrupts the holding circuit for the third control relay 490 so that this relay releases to restore the contacts controlled thereby to their normal condition.

Thus, when the pulse generator 700 next operates, the operated mark relays in the adapter circuits are released and the ground applied to the conductor 775 is forwarded through the closed contacts 474 and 423 and a pair of normally closed contacts 441 to complete an operating circuit for the fourth counting relay 440. In operating, this relay opens the contacts 441, 444, 446—49 and closes a plurality of contacts 442, 443 and 445. The contacts 442 complete a holding circuit for the fourth counting relay 440. The closure of the contacts 443 prepares a portion of an operating circuit for a sixth counting relay 460. The closure of the contacts 445 prepares a portion of an operating circuit for the second control relay 480. The opening of the contacts 447—449 disconnects the "4" hundreds, tens and units identifying conductors from the conductor 776 to prevent the recording of additional pulses on the magnetic tapes of the adapters having a hundreds digit of a value of "4."

When the pulse generator 700 next operates, the ground applied to the conductors 776 operates the mark pulse relays in the seized adapter circuits in the "A" group to record a fifth mark pulse in the group of mark pulses representing the value of the hundreds digit. The ground applied to the conductor 778 is forwarded over the above described path including the closed contacts 445 and 482 to operate the second control relay 480 which, in operating, completes a holding circuit at the closed contacts 483 and, at the closed contacts 484, prepares an additional portion of the operating circuit for the fifth counting relay 450. The opening of the contacts 481 interrupts the holding circuit for the first control relay 470 so that this relay releases.

The pulse generator 700 then operates to remove ground from the conductors 776 and 778 and to apply ground to the pulsing conductor 775. The removal of ground from the conductor 776 restores the mark pulse relays in the seized adapter circuits in the "A" group to permit the magnetic tape to be advanced a single step following the recording of the fifth mark pulse. The ground applied to the conductor 775 is extended over the above described path including the closed contacts 484 and 433 and a pair of normally closed contacts 451 to operate the fifth counting relay 450. In operating, the relay 450 opens the contacts 451 and 454—457 and closes a plurality of contacts 452 and 453. The closure of the contacts 452 completes the holding circuit for the relay 450, and the closure of the contacts 453 prepares an operating circuit for the third control relay 490. The opening of the contacts 455—457 disconnects the hundreds, tens and units pulsing conductors representing the digit "5" from the conductor 776, thus preventing the recording of additional mark pulses in those adapters having a hundreds digits "5."

When the pulse generator 700 next operates, the application of ground to the conductor 776 completes an operating circuit for the mark relays in all of the adapter circuits in the "A" group including a hundreds digit "6" so that, for instance, a sixth mark pulse is recorded in the adapter recorder 110 and the tape in this recorder is advanced a single step under the control of the relays 220 and 230. The ground applied to the conductor 778 is forwarded over the above described path and the closed contacts 453 and 492 to complete the operating circuit for the third control relay 490 which operates. The closure of the contacts 493 completes a holding circuit for the relay 490 extending to ground through the closed contacts 471, 512 and 812. The closure of the contacts 494 prepares an additional portion of the operating circuit for the sixth counting relay 460. The opening of the contacts 491 releases the second control relay 480 so that the contacts controlled thereby are restored to their normal condition. The pulse generator 700 then operates to apply ground to the conductor 775 and to remove ground from the conductor 776. The ground applied to the conductor 775 is forwarded through the closed contacts 494 and 443 and a pair of normally closed contacts 461 to operate the sixth counting relay 460. In operating, this relay opens the contacts 461 and 464—467 and closes a plurality of contacts 462 and 463. The contacts 462 complete a holding circuit for the relay 460 in the manner described above. The closure of the contacts 463 prepares a portion of an operating circuit for a relay 500. The opening of the contacts 465—467 open the hundreds, tens and units "6" conductors. Thus, the transmission of the group of mark pulses representing the value of the hundreds digit of the designation of the adapters in the "A" group is completed.

In general, therefore, the adapter sender 400 is operated by the pulse generator 700 so that a counting circuit therein including the relays 410, 420, 430, 440, 450 and 460 is operated through a fixed cycle of operation during which the operation of each of the counting relays interrupts the pulsing path extending to one of the six hundreds identifying conductors extending to all of the adapters in the "A" group. These counting relays are operated in synchronism with the application of operating pulses to these identifying conductors so that, when the first counting relay is operated following the transmission of the first mark pulse to the adapter circuit, the conductor representing the hundreds digit "1" is interrupted. Similarly, after the second pulse has been transmitted to the adapter circuits, the operation of the second counting relay interrupts the path representing the hundreds digit "2." Since the adapters in the "A" group are selectively interconnected with only a single one of the pulsing conductors in accordance with the value of the hundreds digit, the adapter recorder, such as the recorder 110, individual to each of the adapter circuits in the "A" group is provided with only the number of mark pulses representing the value of the hundreds digit even though the counting circuit operates through a full cycle of six steps during the sending operation. By the provision of this type of sending circuitry in the adapter sender 400, different adapter designations can be simultaneously transmitted to a plurality of adapter circuits.

The adapter sender 400 in the "A" scanner 118 now operates to transmit a space pulse to all of the adapter recorders for recording immediately following the last of the group of mark pulses, irregardless of whether the group includes one or six pulses, and to also render the six hundreds digit conductors ineffective and the six tens digit conductors effective. More specifically, when the pulse generator 700 next operates to remove ground from the conductor 775 and to apply ground to the conductors 776 and 778, the ground applied to the conductor 776 is not extended to any of the mark relays in the adapter circuits in the "A" group in view of the opening of all of the paths at the open contacts 415, 427, 437, 447, 455 and 465. However, the ground applied to the conductor 778 is forwarded over the above identified path and through the closed contacts 463 and a pair of normally closed contacts 515 to complete an operating circuit for a reset relay 500. The relay 500, in operating, opens a pair of contacts 501 and closes a pair of contacts 502. The closure of the contacts 502 prepares an operating circuit for the upper winding of a reset relay 510, which circuit is not effective due to the provision of a shunting ground at the closed contacts 515.

When the pulse generator 700 operates to apply ground to the conductor 775 and to remove ground from the conductors 776 and 778, the ground shunt for the relay 510 is removed and this relay operates in series with the relay 500 over a circuit from grounded battery through the winding of the relay 500, the closed contacts 502, the upper winding of the relay 510, and a pair of normally closed contacts 521 to ground at the closed contacts 812. In operating, the relay opens the contacts 512, 514, 515, 516 and 518 and closes a plurality of contacts 511, 513 and 517. The closure of the contacts 513 connects the conductor 778 to the lower winding of the relay 510 through the closed contacts 573, 923, 884 and **851*a* and also prepares an operating circuit for an eighth steering relay 520. The opening of the contacts 518 interrupts the above described circuit for applying ground to the conductors representing the values of the hundreds digits of the adapter identifications, and the closure of the contacts 517 connects the space pulse conductor 254 with the conductor 776 through the closed contacts 312, 517, 881 and 852 so that the next time the pulse generator 700 operates, a space pulse is applied to first space relay, similar to the relay 210**, in all of the effective adapter circuits in the "A" group.

The contacts 511 and 512 form a make-before-break contact arrangement so that the closure of the contacts 511 completes a temporary holding circuit for the operated relays 410, 420, 430, 440, 450, 460 and 490 prior to the opening of the contacts 512 to interrupt the above described holding circuits therefor. The holding circuit completed by the closure of the contacts 511 includes a condenser 504 and a resistor 503 connected in series to ground. Thus, the condenser 504 is charged by current flowing through the windings of the above identified relays in the adapter scanner 400 to maintain these relays operated until such time as the charging current for the condenser 504 is reduced to an insufficient value to maintain the relays operated. After this delay interval, the relays 410, 420, 430, 440, 450, 460 and 490 restore to their normal condition to condition the counting circuit in the adapter sender 400 for operation through an additional cycle of operation during which mark pulses are transmitted to and stored in the adapter recorders in the A group representing the values of the tens digits of the adapter identifications.

When the pulse generator 700 next operates to apply ground to the conductors 776 and 778, the ground applied to the conductor 776 is forwarded through the closed contacts 517 and 312 to operate the space relays in the effective adapter circuits, such as the circuit 108, so that a space pulse is recorded to indicate the completion of the recording of the group of mark pulses representing the value of the hundreds digit. The operation of these relays also operates the advance magnets, such as the magnet 260, to actuate the step-by-step drive mechanisms for advancing the magnetic tapes a single step following the recording of the space pulses. The ground applied to the conductor 778 is forwarded through the closed contacts 513 to energize the lower winding of the relay 510, thereby to maintain this relay in an operated condition. This ground, however, is also forwarded through a plurality of normally closed contacts 555 and 523 to complete an operating circuit for the eighth steering relay 520.

The steering relay 520, in operating, opens the contacts 521, 523 and 527 and closes a plurality of contacts 522, 524, 525 and 526. The contacts 523 and 524 form a make-before-break contact arrangement so that a holding circuit for the relay 520 is completed extending to ground at the closed contacts 812 prior to the opening of the contacts 523 to interrupt the above described operating circuit. The closure of the contacts 525 prepares a portion of an operating circuit for a control relay 550, and the opening of the contacts 527 interrupts an additional point in the circuit for supplying operating signals to the hundreds conductors. The closure of the contacts 526 prepares a circuit for forwarding operating signals to the conductors representing the values of the tens digits of the designations of the adapter circuits in the A group. The opening of the contacts 521 interrupts the above described holding circuit for the reset relays 500 and 510. However, the relay 510 does not release at this time because of the holding circuit for the lower winding extending to ground on the pulsing conductor 778 through the closed contacts 513. However, the reset relay 500 operates to close the contacts 501 and to open the contacts 502. The opening of the contacts 502 interrupts an additional point in the circuits for the relays 500 and 510. The closure of the contacts 501 extends ground from the closed contacts 812 through the closed contacts 511 to reestablish the source of holding ground for the relays in the counting circuit in the adapter sender 400. The closure of the contacts 501 also discharges the condenser 504.

When the pulse generator 700 next operates to remove ground from the conductors 776 and 778, the removal of ground from the conductor 776 releases the space relays in the effective adapter circuits. The removal of ground from the conductor 778 interrupts the above described holding circuit for the second reset relay 510 so that this relay releases to restore the contacts controlled thereby to their normal condition. The restoration of the contacts 511—515 to their normal position merely serves to aid in conditioning the adapter sender 400 for another cycle of operation. The closure of the contacts 516 forwards ground from the closed contacts 812 through the closed contacts 525 and a plurality of normally closed contacts 536 and 552 to complete the operating circuit for the relay 550.

In operating, the relay 550 closes a plurality of contacts 551, 553 and 554 and opens the contacts 552 and 555. The contacts 552 and 553 form a make-before-break contact arrangement so that the closure of the contacts 553 completes a holding circuit for the relay 550 extending to ground at the closed contacts 812 prior to the opening of the contact 552. The closure of the contact 551 prepares an additional operating circuit for the second reset relay 510, which circuit is interrupted at the open contacts 502. The closure of the contacts 554 prepares a portion of an operating circuit for a ninth steering relay 530.

Referring back to the above described release of the relay 510, the closure of the contacts 518 connects the conductor 776 through the closed contacts 526 and 538 to the six pusing paths controlled by the contacts 416, 428, 438, 448, 456 and 466 extending to the six tens digit conductors which are selectively strapped to the adapters in the "A" group in accordance with the values of the tens digits of the adapter designations. Thus, the adapter sender 400 is now conditioned for a cycle of operation during which variable numbers of mark pulses are transmitted to all of the effective adapters in the "A" group, in accordance with the various values of the tens digits of the adapter designations. During this second cycle of operation, the relays 410, 420, 430, 440, 450, 460, 470, 480 and 490 are operated under the control of the pulse generator 700 in the manner described above.

At the end of this second cycle of sending operation, the relays 460 and 490 are in an operated state, as described above. Following the operation of the relay 460 and when the pulse generator 700 next applies ground to the conductor 778, this ground is forwarded through the closed contacts 463 and 515 to again operate the reset relay 500. When the pulse generator 700 removes ground from this conductor, the second reset relay 510 is operated over a circuit extending through the winding of the first reset relay 500, the closed contacts 502, the upper winding of the relay 510, the closed contacts 522, 551 and 531 and to ground at the closed contacts 812. The closure of the contacts 517 when the relay 510 operates again prepares a path for extending a ground pulse to the space pulse conductor 254, and the opening of the contacts 518 interrupts the path for supplying signals to the conductors representing the tens digits of the adapter designations. The opening of the contacts 512 and the closure of the contacts 511 again initiates the timed release of the operated relays in the counting chain of the sender 400. The closure of the contacts 513, in addition to preparing a holding circuit for the relay 510, also prepares a circuit to forward ground through the closed contacts 554 and a plurality of normally closed contacts 565 and 533 to the operating winding of the relay 530. Thus, when the pulse generator 700 next operates to apply ground to the conductors 776 and 778, a space pulse is recorded on the magnetic tapes of all of the effective adapter recorders, and this ground is forwarded over the above identified circuit to operate the ninth steering relay 530.

In operating, this relay opens the contacts 531, 533, 536, and 538 and closes a plurality of contacts 532, 534, 535 and 537. The contacts 534 and 533 form a make-before-break contact arrangement so that the closure of the contacts 534 completes a holding circuit for the relay 530 extending to ground at the closed contacts 812 prior to the opening of the contacts 533. The closure of the contacts 535 prepares an operating circuit for a relay 560, which circuit is interrupted at the open contacts 516. The opening of the contacts 538 interrupts another point in the path for applying signals to the tens digit conductors, and the concurrent closure of the contacts 537 prepares a path extending through a pair of closed contacts 549 to the units digit conductors controlled by the contacts 417, 429, 439, 449, 457 and 467. The closure of the contacts 532 prepares an additional operating circuit for the second reset relay 510, and the concurrent opening of the contacts 531 interrupts the holding circuit for the relays 500 and 510. However, the relay 510 is maintained operated by the ground applied through the closed contacts 513 to the lower winding of the relay 510. Accordingly, this relay does not release. However, the relay 500 releases to again open the contacts 502 and close the contacts 501. The closure of the contacts 501 extends holding ground to the released relays in the counting circuit in the adapter sender 400 and discharges the condenser 504, as described above.

When the pulse generator 700 next operates to remove ground from the conductors 776 and 778 the holding circuit for the lower winding of the relay 510 is interrupted and this relay releases to restore the contacts controlled thereby to their normal condition. Further, this releases the operated space relays in the adapter circuits so that the magnetic tape is advanced a single step. In releasing, the relay 510 closes the contacts 516 so that ground from the closed contacts 812 is extended through the closed contacts 525 and 535 and a plurality of normally closed contacts 545 and 562 to complete an operating circuit for a relay 560. The relay 560, in operating, closes a plurality of contacts 561, 563 and 564 and opens the contacts 562 and 565. The contacts 562 and 563 form a make-before-break contact arrangement so that the closure of the contacts 563 completes a holding circuit for the relay 560 prior to the opening of the contacts 562. The closure of the contacts 561 prepares an additional portion of an operating circuit for the second reset relay 510. The closure of the contacts 564 prepares an operating circuit for a tenth steering relay 640.

Referring back to the above described release of the relay 510 at the end of the second cycle of operation of the sender 400, the closure of the contact 518 connects the pulsing conductor 776 through the closed contacts 518, 526, 537, and 549 to the six units digit conductors which are controlled by the contacts 417, 429, 439, 449, 457 and 467 and which are selectively strapped to the adapters in the "A" group in accordance with the values of the units digits of their designations. Thus, during the succeeding operations of the pulse generator 700, the counting circuit in the adapter sender 400 is operated through another cycle of operation during which variable numbers of mark pulses are transmitted to and stored in the adapter recorders, such as the recorder 110, associated with the effective adapter circuits in the "A" group. At the completion of this third cycle of operation and when the relays 460 and 490 are again operated, the above described circuits are completed for sequentially operating the reset relays 500 and 510. The operation of the relay 510 again prepares a circuit for applying a ground pulse to the space pulse conductor 254 and also initiates the timed release of the relays in the counting circuit of the adapter sender 400. The closure of the contacts 513, in addition to preparing a holding circuit for the relay 510, prepares an additional point in the operating circuit for the tenth steering relay 540 so that, when ground is next applied to the conductor 778, this ground is extended through the closed contacts 513, 554, and 564 and a pair of normally closed contacts 542 to operate the relay 540. A space pulse is also recorded on the tapes in the effective recorders at this time, and these tapes are advanced a single step.

The operation of the relay 540 opens the contacts 541, 542, 545, 546 and 549 and closes a plurality of contacts 543, 544, 547 and 548. The contacts 542 and 543 form a make-before-break contact arrangement so that the closure of the contacts 543 completes a holding circuit for the relay 540 extending to ground at the closed contacts 812 prior to the opening of the contacts 542. The closure of the contacts 544 prepares a portion of an operating circuit for a stop relay 570. The contacts 546 and 547 form a make-before-break contact arrangement so that the closure of the contacts 547 completes a holding circuit for the relay 850 extending to ground at the closed contacts 812 prior to the opening of the contacts 546. The opening of the contacts 549 interrupts an additional point in the above described circuit for applying operating signals to the six paths representing the units digits of the adapter designations. The closure of the contacts 548 provides an additional source of ground for maintaining the relay 860 operated.

When the pulse generator 700 next operates to remove ground from the conductors 776 and 778, the removal of ground from the conductor 778 interrupts the holding circuit for the lower winding of the stop relay 510 so that this relay releases and, in doing so, closes the contacts 516.

The closure of the contacts 516 forwards ground from the closed contacts 812 through the closed contacts 525, 535, and 544 and a pair of normally closed contacts 571 to complete an operating circuit for the stop relay 570. In operating, the stop relay 570 opens the contacts 571, 573 and 574 and closes the contacts 572. The closure of the contacts 572 completes a holding circuit for the relay 570 extending to ground at the closed contacts 812 prior to the opening of the contacts 571. The opening of the contacts 573 disconnects the pulsing conductor 778 from the adapter scanner 400. The opening of the contacts 574 interrupts the above described holding circuit for the relay 850 so that this relay releases.

When the relay 850 is released, the contacts controlled thereby are restored to their normal condition. The opening of the contacts 851 disconnects the pulsing conductor 775 from the counting circuits in both the clock-calendar sender 800 and the adapter sender 400. The opening of the contacts 852 disconnects the pulsing conductor 776 from both of the senders 400 and 800. The opening of the contacts 853 removes the ground provided at the closed contacts 821 from the hold conductor extending to the effective adapter circuits in the "A" group, such as the hold conductor 252. The removal of ground from the hold conductor signifies the termination of the sending operation by the "A" scanner 118 and permits the adapter circuit 108 to record additional items of information pertaining to the toll call which are derived from different signal sources, such as means for timing the duration of the call. The closure of the contacts 854 reestablishes a point in the operating circuit for the start relay 840, which circuit is interrupted at the open contacts 831.

The opening of the contacts 855 interrupts an additional point in the holding circuit for the relay 850, and the opening of the contacts 858 removes one source of holding ground for the relay 860; however, this relay is held operated by the ground provided at the closed contacts 548 in the adapter sender 400. The opening of the contacts 859 interrupts another point in the open operating circuit for the alarm relay 820. The closure of the contacts 857 provides means for discharging the condenser 814 through the series resistor 815, and the opening of the contact 856 interrupts the holding circuit for the timing relay 810 so that this relay releases.

In releasing, the relay 810 closes the contacts 811 and opens the contacts 812 and 813. The closure of the contacts 811 completes a portion of the operating circuit for the alarm relay 820, but this circuit is interrupted by the prior release of the relay 850 to open the contacts 859. The opening of the contacts 812 removes the source of main holding ground for the "A" scanner 118 so that the operated relays 900 and 920 in the clock-calender sender 800 are released. The opening of the contacts 812 further removes ground from the holding circuit for the operated relays in the adapter sender 400 so that the relays 520, 530, 540, 550, 560 and 570 release. The release of the relay 540 opens the contacts 548 to remove the holding ground from the relay 860.

The relay 860 now releases to restore the contacts controlled thereby to their normal condition. The opening of the contacts 866 removes ground from the upper winding of the differential relay 590 so that this relay reoperates to close the contacts 591, 593, 594, 595, 596, 597 and 599 and to open the contacts 592, 598 and 591*a*. The opening of the contacts 592 interrupts the operating circuit for the relay 585, but this relay is slow-to-release and does not release at this time. The closure of the contacts 591 returns ground to the hold conductor through the closed contact 861. However, the adapter circuits formerly connected to the output of the "A" scanner 118 have previously been released and the application of ground to the hold conductor merely conditions the "A" scanner 118 for another cycle of operation under the control of the supervisory circuit 126.

The closure of the contacts 593, 594, 595 and 596 connects the common space pulse conductor for all of the adapter circuits and all of the mark pulse conductors that are strapped to the adapters in the "A" group to one side of the lower operating winding of an alarm relay 580, thereby to prepare circuits for testing these pulse transmitting circuits for a ground fault. More specifically, the condenser 582 is connected in a charging circuit through the closed contacts 598 and 591*a* during the period in which the relay 590 is released. When the contacts 597 and 599 are closed, one terminal of the condenser 582 is connected to ground through the closed contacts 597, and the other terminal of the condenser is connected to the other terminal of the lower winding of the relay 580 through the closed contacts 587. The condenser 582 attempts to discharge over a circuit including the closed contacts 599, 587, the lower winding of the relay 580, the contacts 593, 594, 595 and 596 in parallel, and then to ground over all of the pulsing paths of the "A" scanner 118 in parallel, such as those including the conductors 254, 255, 256 and 257. The negative potential to which the condenser 582 has been charged can not be discharged unless one of these conductors is now grounded. Thus, no discharge current flows through the lower winding of the relay 580. However, in the event that one of the pulsing conductors is connected to ground, perhaps through the failure of insulation, a discharge path for the condenser 582 is provided and the lower winding of the alarm relay 580 is momentarily energized. This operates the relay 580 to close a pair of contacts 581. The closure of the contacts 581 completes a holding circuit for the upper winding of the relay 580 extending to ground through a pair of normally closed contacts 583 on a release key. The relay 580 can also be provided with additional contact springs to energize audible or visible alarms to indicate the failure of the test on the pulsing conductors. The alarm relay 580 remains operated until such time as the relay is released by manually opening the contacts 583.

Assuming, however, that the ground test is satisfactorily completed, the relay 585 releases after its slow-to-release interval to close the contacts 586 and to open the contacts 587. The closure of the contacts 586 returns ground to the pickup lead extending to the supervisory circuit 126 through the closed contacts 862. The opening of the contacts 587 interrupts the above described path for discharging the condenser 582.

Referring back to the above described release of the relay 810, the opening of the contacts 813 interrupts the circuit for the relay 830 so that, after the slow-to-release interval thereof, the contacts 831 are closed and the contacts 832 are opened. The closure of the contacts 831 prepares an additional point in the operating circuit for the start relay 840, thereby to permit the "A" scanner 118 to be again seized for operation. The "A" scanner 118 has now been restored to its normal condition.

As indicated above, the "A" scanner 118 includes means for operating the "A" transfer relay 750 in the supervisory circuit 126 when an abnormal operating condition is established in the scanner 118 which prevents its normal operation. More specifically, the scanner 118 includes the alarm relay 820 which is operated whenever a cycle of operation during which date and time and adapter identification information is to be transmitted is not completed within a predetermined time interval. As described above, when the scanner 118 is seized, the relay 840 is operated and released and the relay 850 is operated to close the contacts 859. Further, the timing relay 810 is connected in series with the condenser 814 and the resistor 815 so that the relay 810 is maintained operated by the charging circuit for the condenser 814. If the sending operation is not terminated within the delay interval provided by charging the condenser 814, the relay 810 is released to close the contacts 811 and to open the contacts 812. The opening of the contacts 812 removes main ground from the scanner 118 to substantially restore it to a normal condition.

The closure of the contacts 811 forwards ground through the contacts 859, which contacts are maintained closed until the sending cycle is completed, and the closed contacts 847 to complete an operating circuit for the alarm relay 820. This relay operates to open the contacts 821 and to close a plurality of contacts 822 and 823. The closure of the contacts 822 completes a holding circuit for the alarm relay 820 extending to ground at the closed contacts 825 on the alarm key. The closure of the contacts 823 forwards ground for operating the transfer relay 750 in the supervisory circuit 126. The opening of the contacts 821 removes the ground that is normally applied to the hold conductor through the closed contacts 853, thereby to drop off the connected adapter circuits. Thus the alarm relay 820 is operated to establish an alarm condition in the event that a complete cycle of operation of the scanner 118 is not completed with a predetermined time interval.

The scanner 118 also includes further means for operating the alarm relay 820 in the event that marking ground is not encountered on one of the numerically designated conductors extending from the clock and calendar circuit 116 during a cycle of operation of the counting circuit in the sender 800. More specifically, if such a ground is not encountered so that the relays 870 and 880 are operated to interrupt sequential operation of the counting relays, the application of the thirteenth operating signal from the pulse generator 700 to the counting circuit shown in FIGS. 11 and 12 causes the operation of the relays 1220 and 1270, as indicated in the above table. When the relay 1270 operates, a plurality of contacts 1271, 1273, 1274 and 1275 are closed and a pair of contacts 1272 are opened. The contacts 1272 and 1273 form a make-before-break contact arrangement so that the closure of the contacts 1273 completes a holding circuit for the relay 1270 extending to ground through the closed contacts 1103 and 812 prior to the opening of the contacts 1272 to interrupt the operating circuit for the relay 1270. The closure of the contacts 1271 prepares an operating circuit for the relay 1220 so that this relay is operated when ground is next applied to the pulsing conductor 775 by the pulse generator 700. The closure of the contacts 1274 supplies ground to the alarm relay 820 so that this relay operates to perform the same functions described above.

The closure of the contacts 1275 artificially supplies ground directly from the closed contacts 812 to the windings of the stop relays 870 and 880 so that these relays operate. The operation of these relays to open the contacts 872 together with the subsequent removal of ground from the conductor 775 causes the release of the relays 1270 and 1220 so that he counting chain is restored to its normal condition. These operations also cause the release of the stop relays 870 and 880 under the control of the pulse generator 700. Thus, the scanner circuit 118 includes means for operating the supervisory circuit 126 to remove the scanner 118 from operation when the sending operation of the scanner 118 is not completed within a predetermined period of time and when the counting circuit in the clock-calendar sender 800 does not encounter stop ground during any particular cycle of operation.

EMERGENCY SCANNER 128

Figure 6:
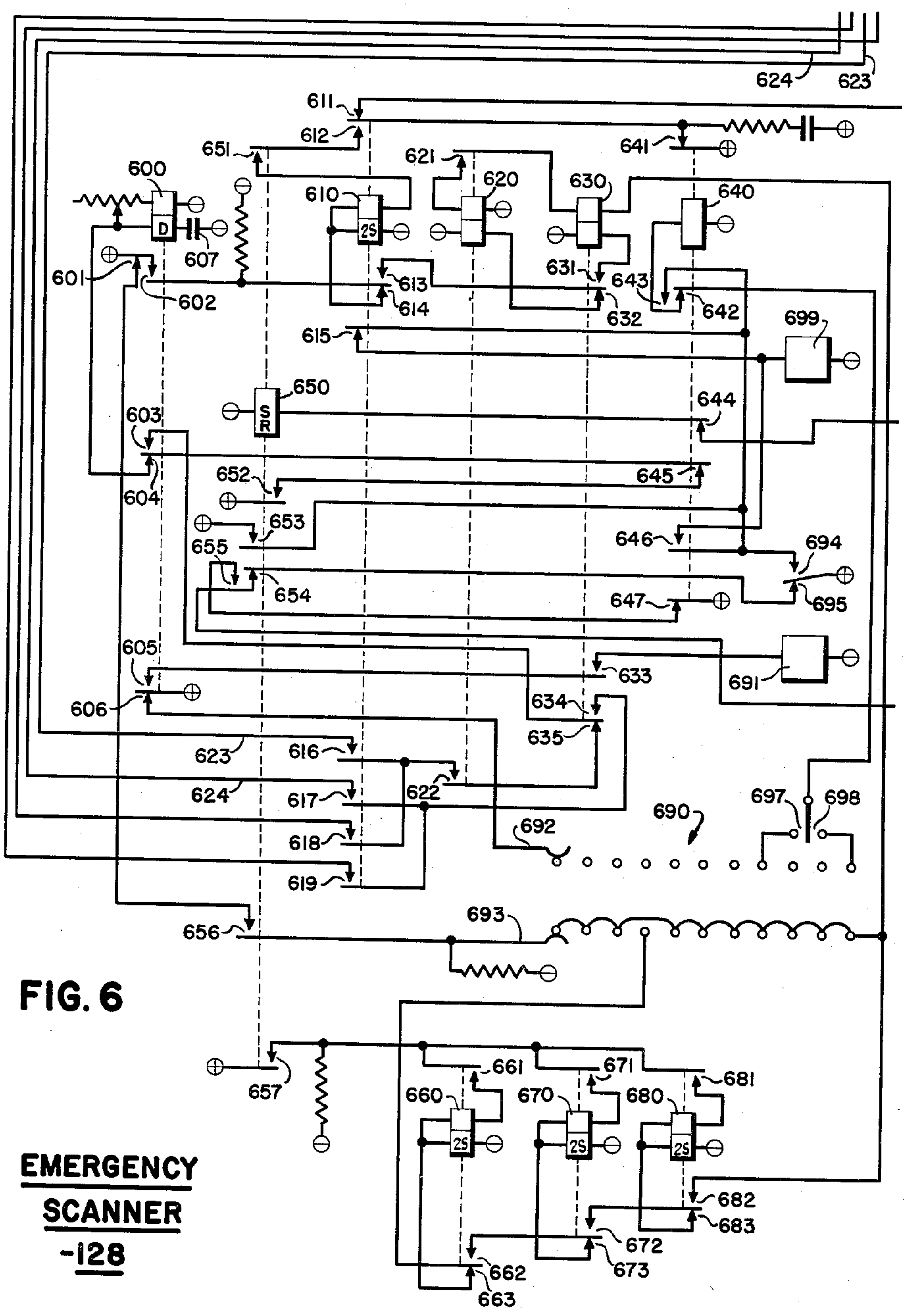

The emergency scanner or sender 128 (FIG. 6) is placed in operation in response to the existence of an abnormal operating condition in both of the scanners 118 and 120 or to the failure of a common circuit component, such as the pulse generator 700. The emergency scanner 128 provides a series of arbitrary signals in place of the signals normally provided by the scanners 118 and 120, so that, since a toll call can be billed without accurate date and time and identifier information, the number of items of information provided on the magnetic tapes of the adapter recorder is complete. This permits a normal playback operation to be performed when the data stored on the tapes of the adapter recorders is played back to recording equipment of the type shown in the above identified Clement et al. application.

As indicated above, when the adapter circuit 108 requires date and time information, the switch 258 is closed to forward ground through the normally closed contacts 242 to operate the relay 250. The operation of the relay 250 closes the contacts 251, 253*a*, 254*a*, 255*a*, 256*a* and 257*a* to condition the circuits including the conductors 254, 255, 256 and 257 for receiving information from the emergency scanner 128. The closure of the contacts 253*a* connects the operating winding of the pickup relay 240 with the conductor 253. As described above, when both of the scanners 118 and 120 are disabled, the conductor 253 is extended through the closed contacts 742 and 722 and a pair of normally closed contacts 611 to ground at a pair of normally closed contacts 641. Thus, the pickup relay 640 is operated in direct response to the operation of the relay 250. This is true because the supervisory circuit 126 is effectively by-passed and because there is no need to perform an allotting operation in which one of the senders 120 or 118 is rendered effective to control the transmission of the necessary date and time and adapter identification information to the recorder 110. Accordingly, the relay 240 operates at this time to close the contacts 241 and 243—246 and to open the contacts 242. The closure of the contacts 241 connects the winding of the relay 250 to the hold conductor 252 which is connected through the closed contacts 744, 726, and 747 and a pair of normally closed contacts 654 to ground at a pair of normally closed off-normal contacts 695. Thus, holding ground is immediately provided for the relay 250 to insure that this relay remains operated to connect the conductors 254—257 to the relays in the adapter circuit 108.

Referring back to the above described operation of the relay 250, the closure of the contacts 259 applies start ground to the conductor 259 which is forwarded through the closed contacts 748, 729 and 742*a* and a pair of normally closed contacts 644 to operate a start relay 650.

The operation of the relay 650 closes a plurality of contacts 651, 652, 653, 655, 656 and 657 and opens the contacts 654. The contacts 654 and 655 form a make-before-break contact arrangement so that the closure of the contacts 655 completes a circuit for extending ground to the hold conductor 252 from a pair of normally closed contacts 647 prior to the opening of the contacts 654 to interrupt the above described circuit. The closure of the contacts 656 forwards ground to a wiper 693 of a stepping switch 690 in the scanner 128, and this is extended by the strapping on the contact bank engaged by the wiper 693 to provide a source of operating ground for a space relay 630 and a source of holding ground for a mark relay 620. The closure of the contacts 657 provides a source of holding ground for three counting relays 660, 670 and 680. The closure of the contacts 653 completes a circuit including a pair of normally closed contacts 615 for operating a reset magnet 699 in the stepping switch 690. The operation of the magnet 699 returns the wipers 692 and 693 to their normal home position in the event that the switch 690 is in an off-normal condition. The closure of the contacts 651 prepares an operating circuit for a pulse assist relay 610.

The closure of the contacts 652, when the start relay 650 is operated, forwards ground through a plurality of normally closed contacts 645 and 604 to complete a time delayed operating circuit for a pulse generator relay 600. When ground is applied to both of the windings of the differential pulse generator relay 600, current flows through the upper winding and also through the lower winding to charge a condenser 607. This differential flow of current prevents the operation of the relay 600 until such time as the condenser 607 becomes charged. The absence of current flow in the lower winding of the pulse generator relay 600 permits this relay to operate to open a plurality of contacts 601, 604 and 606 and to close a plurality of contacts 602, 603 and 605. The closure of the contacts 602 completes a preliminary operating circuit for the two-step pulse assist relay 610 extending through a pair of normally closed contacts 614 so that this relay operates a preliminary transfer contact arrangement to open the contacts 611 and to close a pair of contacts 612. The opening of the contacts 611 removes ground from the pickup lead 253, but the pickup relay 240 remains operated over the local holding circuits provided in the adapter circuit 108. The closure of the contacts 612 forwards ground from the closed contacts 641 through the closed contacts 651 to provide a holding and full operating circuit for the relay 610 including both of the operating windings connected in series to grounded battery. However, this circuit is not effective at this time due to the ground shunt provided at the closed contacts 614.

The opening of the contacts 604 by the operation of the pulse generator relay 600 interrupts the above described operating circuit for this relay. However, when the contacts 604 are opened, the condenser 607 discharges through both of the windings of the relay 600 in series and maintains this relay operated until the condenser 607 has been substantially discharged. At this time, the relay 600 releases to restore the contacts controlled thereby to their normal condition. The closure of the contacts 604 initiates the charging of the condenser 607 and thus relays the reoperation of the relay 600. However, the opening of the contacts 602 removes the ground shunt around the upper winding of the relay 610 so that this relay fully operates over a circuit extending from grounded battery through the two windings of the relay 610 in series and to ground through the closed contacts 651, 612 and 641. In fully operating, the relay 610 opens the contacts 614 and 615 and closes a plurality of contacts 613, 616, 617, 618 and 619.

The opening of the contacts 614 interrupts the above described operating circuit for the relay 610 at an additional point, and the opening of the contacts 615 interrupts the above described circuit for operating the release magnet 699 so that this magnet releases. The closure of the contacts 613 prepares an operating circuit for the lower winding of the mark relay 620. The closure of the contacts 616—619 interconnects the output leads of the emergency scanner 128 with the mark and space leads extending to the adapters in the "A" and "B" groups. More specifically, the closure of the contacts 616 connects pulsing circuits in the emergency scanner 128 to a mark pulse conductor 623 which is connected in multiple to at least one of the hundreds digit identifying conductors in all of the adapters in the "A" group. As an example, the conductor 623 is connected to the hundreds digit conductor 255 which extends through the closed contacts 255a, the diode 291 and the closed contacts 244 to the operating winding of the first mark relay 230 in the adapter circuit 108. Similarly, the closure of the contacts 617 connects pulsing circuits in the emergency scanner 128 to a common mark pulse conductor 624 which is connected to the space conductor 254 which is common to all of the adapter circuits in the "A" group. Similarly, the closure of the contacts 618 and 619 connects pulsing circuits in the emergency scanner 128 to at least one identifying conductor in each of the adapters in the "B" group and to the common space pulse conductor for the adapters in the "B" group. Accordingly, during a cycle of operation, the emergency scanner 128 provides signals to all of the effective adapters in both "A" and "B" groups.

When the condenser 607 is fully charged, the pulse generator relay 600 again operates to close the contacts 602. This forwards ground through the closed contacts 613 and a pair of normally closed contacts 632 to energize the lower winding of the mark relay 620 so that this relay operates to close a plurality of contacts 621 and 622. The closure of the contacts 621 prepares an operating circuit for the upper winding of the relay 620 to maintain this relay operated and also prepares an operating circuit for an upper winding of the space relay 630, which circuits are interrupted at the open contacts 601. The closure of the contacts 622 applies a ground pulse to the mark pulse conductor 623 to record a first mark pulse on the magnetic tape in the adapter recorders representing the arbitrary value of the first item of date and time information. More specifically, ground is extended from the closed contacts 652 through the closed contacts 645, 603, 635, 622 and 616 to operate the first mark relay 230. The operation of this relay in turn operates the relay 220 so that the mark pulse head 280 in the adapter recorder 110 is momentarily energized to record a first mark pulse on the tape. The operation of these relays also energizes the advance magnet 260 so that the step drive mechanism in the recorder 110 advances the magnetic tape a single step following the recording of the mark pulse.

After the slow-to-release interval of the pulse generator relay 600, this relay releases to restore the contacts controlled thereby to their normal condition. The contacts 601 and 602 form a make-before-break contact arrangement so that the closure of the contacts 601 completes an operating circuit for the space relay 630 and a holding circuit for the mark relay 620 extending from ground through the closed contacts 601 and 656 to the wiper 693 which is in engagement with the home contact of the switch 690. This ground is further extended over the strapping in the contact bank engaged by the wiper 693 through the upper winding of the space relay 630 and to grounded battery through the closed contacts 621 and the upper winding of the relay 620. This circuit is completed prior to the opening of the contacts 602 to interrupt the above described operating circuit for the mark relay 620. Thus, the relay 620 remains operated and the space relay 630 is operated to open the contacts 632 and 635 and to close a plurality of contacts 631, 633 and 634. The opening of the contacts 635 together with the opening of the contacts 603 when the relay 600 releases interrupts the above described circuit for applying ground to the mark pulse conductor 623 so the advance magnets, such as the magnet 260, release. The concurrent closure of the contacts 634 prepares a circuit for applying ground to the space pulse conductor 624. The closure of the contacts 631 prepares a holding circuit for the lower winding of the space relay 630, and the opening of the contacts 632 interrupts an additional point in the above described operating circuit for the lower winding of the mark relay 620. The closure of the contacts 633 prepares an operating circuit for a motor magnet 691 in the stepping switch 690.

Thus, when the pulse generator relay 600 next operates, ground is forwarded through the closed contacts 602, 613 and 631 to energize the lower winding of the space relay 630, thereby to maintain this relay operated. This circuit is completed prior to the opening of the contacts 601 to interrupt the above described operating circuit for the upper winding of the space relay 630. However, the opening of the contacts 601 interrupts the holding circuit for the mark relay 620 so that this relay releases to open the contacts 621 and 622. The closure of the contacts 603 forwards ground through the closed contacts 652, 645, 603, 634 and 617 to the space pulse conductor 624 so that the space relays in the effective adapter circuits, such as the circuit 108, are operated to momentarily energize the space heads 270 to record a space pulse on the magnetic tape immediately following the single mark pulse previously recorded by the operation of the mark relay 620. The operation of the space relays, such as the relays 200 and 210, also energizes the advance magnet 260 to operate the step drive mechanism for advancing the magnetic tape in the adapter recorder 110 a single step following the recording of the space pulse.

The closure of the contacts 605 forwards ground through the closed contacts 633 to energize the motor magnet 691. The energization of the motor magnet 691 advances the wipers 692 and 693 a single step from the home position to the contacts forming the first stepping position of the switch 690. As these wipers advance a single step, the off-normal contacts 695 are opened and a pair of off-normal contacts 694 are closed. The closure of the contacts 694 provides a source of holding ground for a stop relay 640 and a source of ground for operating the reset magnet 699 at the end of the cycle of operation of the emergency scanner 128.

When the relay 600 next releases, the opening of the contacts 603 removes ground from the common space pulse conductor 624 to release the space relays, such as the relays 200 and 210 in the adapter circuit 108. The opening of the contacts 605 interrupts the operating circuit for the motor magnet 691 so that this magnet is released. The opening of the contacts 602 interrupts the holding circuit for the lower winding of the space relay 630 so that this relay releases to restore the contacts controlled thereby to a normal position.

Accordingly, the emergency scanner 128 has now transmitted a single mark pulse and a single space pulse in sequence to the adapter recorder 110, as well as to the other adapter recorders connected to effective adapter circuits in the "A" and "B" groups. This first combination of a mark pulse and a space pulse represents the numerical designation of the month in which the toll call was placed and is supplied to the tape of the adapter recorders, such as the recorders 110 and 124, in place of the variable group of pulses supplied by the "A" and "B" scanners 118 and 120, as described in detail above. The provision of the single mark pulse and single space pulse permits the proper operation of the playback and recording facilities during the readout of the data from the adapter recorders 110 and 124 and thus permits a toll ticket to be printed even though the first item of date information cannot be supplied because of the existence of abnormal operating condition in the supervisory circuit 126 or in the scanners 118 and 120.

The emergency scanner 128 then operates under the control of the pulse generator relay 600 to record two additional mark and space pulse combinations in place of the tens days and units days digits normally supplied under the control of the clock and calendar circuit 116. At the completion of the recording of the third space pulse, the stepping switch 690 is advanced to its third stepping position in which the wiper 693, rather than engaging a contact in its bank that is strapped to the upper winding of the space relay 630, engages a contact which is connected through a pair of normally closed contacts 663 to the operating windings of a first counting relay 660. This conditions the emergency scanner 128 to transmit a group of more than one mark pulse representing the value of the tens hours digit. It is necessary to transmit more than a single mark pulse in this group because, as described in detail in the above identified copending Harris application, the value of the tens hours digit is varied by the clock and calendar circuit 116 in accordance with the rate structure which is to be applicable in computing the toll charge for the call. The storage of a single mark pulse as the value of the tens hours digit would cause the selection of an improper rate structure. Accordingly, the emergency scanner 128 includes means for transmitting three mark pulses followed by a space pulse as a representation of the arbitrary value to be stored representing the tens hours digit.

Thus, when the relay 600 next releases to release the space relay 630 and the magnet 691, the closure of the contacts 601 completes the above described circuit including the wiper 693 for operating the first counting relay 660. This relay is of the two-step type and closes a pair of preliminary make contacts 661 to extend holding and full operating ground to the relay 660 from the closed contacts 657. When the relay 600 operates to open the contacts 601, the ground shunt at the contacts 663 is removed and the relay 660 operates fully to open the contacts 663 and to close a pair of contacts 662. The closure of the contacts 662 prepares an operating circuit for a second counting relay 670.

In operating, the relay 600 also closes the contacts 602 to forward ground through the closed contacts 632 to again operate the mark relay 620 so that the contacts 621 and 622 are closed. The closure of the contacts 622, together with the closure of the contacts 603, applies a first mark pulse to the conductor 623. The closure of the contacts 621 again prepares the holding circuit for the mark relay 620 and an operating circuit for the space relay 630. However, this circuit is not completely prepared inasmuch as the wiper 693 does not engage a contact that is strapped to the upper winding of the relay 630. Accordingly, when the pulse generator relay 600 releases, the opening of the contacts 603 removes ground from the mark pulse conductor 623. The opening of the contacts 602 interrupts the above described operating circuit for the mark relay 620 so that this relay releases. The closure of the contacts 601 rather than completing a holding circuit for the upper winding of the mark relay 620 and an operating circuit for the upper winding of the space relay 630 forwards ground through the closed contacts 656, the wiper 693, the closed contacts 662 and a pair of normally closed contacts 673 to complete a preliminary operating circuit for the second counting relay 670. The preliminary operation of the two-step relay 670 closes a pair of preliminary make contacts 671 to connect ground from the closed contacts 657 to the two windings of the relay 670. However the provision of the ground shunt at the closed contacts 673 prevents full operation of the second counting relay 670 at this time.

Accordingly, when the pulse generator relay 600 next operates to open the contacts 601 and to close the contacts 602 and 603, among others, the mark relay 620 is again operated to close the contacts 622 so that a second ground pulse is applied to the mark pulse conductor 623. The opening of the contacts 601 removes the ground shunt from the lower winding of the second counting relay 670 so that this relay fully operates to open the contacts 673 and to close a pair of contacts 672. The closure of the contacts 672 prepares an operating circuit for a third counting relay 680. Thus, when the pulse generator relay 600 next releases to remove ground from the mark pulse conductor 623, the mark relay 620 is again released and ground is forwarded by the closed contacts 601 over the contacts 656, the wiper 693, the closed contacts 662 and 672, and a pair of normally closed contacts 683 to partially operate the third counting relay 680. This closes a pair of preliminary make contacts 681 to prepare a holding and full operating circuit for the third counting relay 680.

When the relay 600 next operates to open the contacts 601 and to close the contacts 602 and 603, among others, a third mark pulse is transmitted to the conductor 623 by the operation of the relay 620, and the ground shunt is removed from the third counting relay so that this relay fully operates to close the contacts 682 and to open the contacts 683. The closure of the contacts 682 prepares a holding and operating circuit for the relays 620 and 630. The relay 600 then releases to terminate the third ground pulse applied to the mark pulse conductor 623. The release of the relay 600, by the closure of the contacts 601, forwards ground through the closed contacts 656, the wiper 693, the closed contacts 662, 672 and 682, the upper winding of the space relay 630, the closed contacts 621 and the upper winding of the mark relay 620. This circuit operates the relay 630 and maintains the relay 620 operated when the contacts 602 are subsequently opened.

The operation of the relay 630, together with the succeeding cycle of operation of the pulse generator relay 600, causes the recording of a space pulse on the magnetic tape immediately following the group of three pulses representing the value of the tens hours digit, the one step advance of the magnetic tape, and the operation of the motor magnet 691 so that the wipers 692 and 693 are advanced to their fourth stepping position. This cycle of operation of the relay 600 also first interrupts the above described holding circuit for the mark relay 620 so that this relay releases and then releases the space relay 630.

In a similar manner, the pulse generator relay 600 operates the mark relay 620 and the space relay 630 under the control of the stepping switch 690 so that single mark pulses are recorded on the magnetic tape followed by space pulses representing the values of the units hours digit, the tens minutes digit, the units minutes digit and the adapter hundreds, tens, and units digits. Incident to recording the space pulse following the single mark pulse representing the units digit of the adapter identification, the stepping switch 690 is operated to advance the wipers 692 and 693 to the tenth stepping position of the switch 690. When the pulse generator relay 600 next releases to release the space relay 630, the closure of the contacts 606 forwards ground over the wiper 692, the last contact in the bank associated therewith, and a pair of closed contacts 698 on a manually actuated switch to complete an operating circuit for the stop relay 640, which circuit includes a pair of normally closed contacts 642.

In operating, the relay 640 opens the contacts 641, 642, 644, 645 and 647 and closes a plurality of contacts 643 and 646. The contacts 642 and 643 form a make-before-break contact arrangement so that the closure of the contacts 643 completes a holding circuit for the relay 640 extending to ground at the closed off-normal contacts 694 prior to the opening of the contacts 642. The opening of the contacts 644 interrupts the operating circuit for the start relay 650, but this relay is slow-to-release and does not restore at this time. The opening of the contacts 645 prevents the application of ground to the contacts 603 and 604 and thus prevents further operation of the relay 600 and the transmission of additional ground pulses to the mark and space conductors 623 and 624.

The opening of the contacts 641 interrupts the holding circuit for the relay 610 so that this relay restores to its normal condition. The opening of the contacts 616—619 disconnects the pulsing paths extending to the adapter circuits in the "A" and "B" groups from the pulse generating circuits in the emergency scanner 128.

The opening of the contacts 647 removes ground from the hold conductor 252 so that the relay 250 releases to open the contacts 251, 253*a*, 254*a*, 255a, 256*a* and 257*a*, thereby to interrupt the connection between the adapter circuit 108 and the emergency scanner 128. The closure of the contacts 646 completes an operating circuit from the closed off-normal contacts 694 for operating the release magnet 699 so that the stepping switch 690 is restored to its normal position in which the wipers 692 and 693 engage the contacts forming the home position. As the wipers 692 and 693 move to their normal or home position, the off-normal contacts 694 are opened and the off-normal contacts 695 are closed. The opening of the contacts 694 interrupts the holding circuit for the stop relay 640 so that this relay restores to a normal condition. The closure of the contacts 641 provides a source of pickup ground which is extended through the closed contacts 611 to the pickup conductor 253, but this is not effective to control the relay 240 due to the prior release of the relay 250 to open the contacts 253*a*.

The opening of the contacts 251 when the relay 250 is released and the opening of the contacts 644 interrupts the operating circuit for the start relay 650 so that, after its slow-to-release interval, this relay releases to restore the contacts controlled thereby to their normal condition. The opening of the contacts 657 removes holding ground from the counting relays 660, 670 and 680 so that these relays release. The opening of the contacts 652 interrupts an additional point in the operating circuit for the pulse generator relay 600. The closure of the contacts 654 reapplies ground to the hold conductor 252 to condition the emergency scanner 128 for being seized. The remaining operations produced by the release of the relays 610, 640 and 650 merely aid in restoring the emergency scanner 128 to a normal condition.

Accordingly, the emergency scanner 128, which is placed in operation when both of the scanners 118 and 120 are taken out of operation, provides a series of groups of mark pulses representing arbitrary values in place of the date and time and adapter information normally supplied by the ineffective scanners 118 and 120 to permit a playback of the data stored on the magnetic tape of the adapter recorder 110. The emergency scanner 128 provides a single mark pulse representing an arbitrary value "1" in place of the variable values of the digits normally provided under the control of the clock and calendar circuit 116 and the adapter sender 400. However, the value of the tens hours digit provided by the emergency scanner 128 is varied when this digit is used in determining the applicable rate structure so as to permit the selection of the proper rate structure in establishing the monetary charge for the call during the playback operation.

As described above, the stop relay 640 is operated to terminate the operation of the emergency scanner or sender 128 following the storage of ten groups of mark pulses on the tape in the adapter recorder. However, in the event that the clock and calendar circuit 116 is used to provide only date and time information in those instances when the adapter sender 400 is not supplied, the manual switch is operated to open the contacts 698 and to close a pair of contacts 697. In this condition, the stop relay 640 is operated to terminate operation of the emergency scanner 128 immediately following the transmission of the single mark pulse and single space pulse representing the units minutes digit and as the stepping switch 690 is advanced to its seventh stepping position. Similarly, in the event that the programming for the clock and calendar circuit 116 during a readout operation is varied so that the tens hours digit is transmitted at a different position in the readout format, the counting relays 660, 670 and 680 can be selectively strapped to any one of the contacts in the bank engaged by the wiper 693.

In summary, therefore, the present invention includes novel means for supplying date and time and adapter identification information for storage in a register under the control of a supervisory circuit. In this arrangement, the adapter circuits assigned to different groups are normally supplied with date and time information by one of a pair of scanners which are selectively rendered effective under the control of the supervisory circuit in accordance with group in which the calling adapter is located. In the event that an abnormal operating condition is established in either one of the scanners or senders, its sending functions are transferred to the remaining operative sender. In the event that both of the sender or scanner units are rendered inoperative or in the event that an abnormal operating condition arises in a common circuit component, such as a pulse generator, both of the senders are taken out of operation and an emergency sender or scanner is rendered effective to supply arbitrary signals to the adapter circuits representing date and time information and adapter identification information. This permits the data pertaining to each of the toll calls to be recorded during a playback operation. The arrangement of the senders or scanners is such that identical date and time information can be transmitted to a plurality of adapter circuits in conjunction with the transmission of different adapter identification signals.

Although the present invention has been described with reference to a particular embodiment thereof, it should be understood that those skilled in the art may make many other modifications and embodiments which will fall within the spirit and scope of the principles of this invention.

What is claimed as new and desired to be secured by Letters Patent of the United States is:

1. An automatic toll ticketing system comprising a plurality of separate circuit extending means each having a register individual thereto, a clock and calendar circuit for providing a continuous indication of date and time, a first signal sender, a second signal sender, and a control circuit common to said plurality of circuit extending means and operable following the seizure of one of said extending means for rendering an idle one of said first and second signal senders responsive to control by said clock and calendar circuit to send signals representing instant date and time to the register individual to said seized one of said circuit extending means.

2. The automatic toll ticketing system set forth in claim 1 in which said plurality of circuit extending means are divided into two groups, and in which said control circuit includes means controlled by the group in which the seized circuit extending means is located for selecting one of said first and second signal senders.

3. An automatic toll ticketing system comprising a plurality of trunk circuits each having a register individual thereto, said trunk circuits being divided into two groups, a clock and calendar circuit for providing a continuous indication of instant date and time, first and second digit sending means connected in common to said clock and calendar circuit, a supervisory circuit controlled by all of said trunk circuits to render a selected one of said first and second digit sending means effective to send a series of digits representing instant date and time to one of said registers in accordance with the seizure of a trunk circuit in a selected one of said groups.

4. The system set forth in claim 3 including means in said supervisory circuit for preventing the seizure of the other of said digit sending means during the operation of said selected one of said digit sending means.

5. An automatic toll ticketing system comprising circuit extending means having register means individual thereto, date and time means operative following the seizure of said circuit extending means for supplying signals representing instant date and time to said register means, and means controlled by the establishment of an abnormal operating condition in said date and time means for rendering said date and time means ineffective and for sending a series of arbitrary signals to said register means in place of said date and time representing signals.

6. An automatic toll ticketing system comprising circuit extending means having register means individual thereto, a clock and calendar circuit for providing a continuous indication of instant date and time, digit sending means controlled by said clock and calendar circuit and operative following the seizure of said circuit extending means for sending signals representing instant date and time to said register means, emergency sender means, and means controlled by the failure of said digit sending means for rendering said digit sending means ineffective and for placing said emergency sender in operation to send arbitrary signals to said register means.

7. An automatic toll ticketing system comprising circuit extending means, register means connected to said circuit extending means, a clock and calendar circuit continuously operative to settings representing instant date and time, first and second sender means controlled by said clock and calendar circuit, control means operative following the seizure of said circuit means for rendering said first sender means effective to send signals representing instant date and time to said register means, control means controlled by the failure of said first sender means for rendering the second sender means effective to supply signals representing instant date and time to said register means, third sender means, and means responsive to the failure of both of said first and second sender means for rendering said third sender means effective to supply arbitrary signals to said register means.

8. The toll ticketing system set forth in claim 7 in which said control means includes means for disabling control of said first sender means by said clock and calender circuit and for transferring control of said second sender means to said clock and calendar circuit.

9. An automatic toll ticketing system comprising circuit extending means, register means connected to said circuit extending means, date and time sending means operated following the seizure of said circuit extending means for sending a predetermined number of digits to said register means representing instant date and time, means for detecting a failure in said date and time sending means, and control means controlled by said detecting means for sending said predetermined number of arbitrary signals to said register means.

10. The system set forth in claim 9 in which said control means includes counting means operated incident to the sending of each of said arbitrary signals to determine the number thereof, and means controlled by said counting means for arresting operation of said control means when said predetermined number of signals has been transmitted.

11. A data handling system comprising a data register, a source of digital information to be transmitted, first and second digit sending means controlled by said source for sending selected digits, pulse generating means for operating both of said sending means, control means for rendering a selected one of said sending means effective to supply signals to said register means under the control of said source and for rendering said pulse generating means effective to operate said selected one of said sending means, and means responsive to the failure of said one sending means for rendering the other of said sending means effective to supply signals to said register means and for rendering said pulse generating means effective to operate said other sending means.

12. The system set forth in claim 11 including a third sending means, and means responsive to the failure of said pulse generating means for rendering said third sending means effective to send signals to said register means.

13. An automatic toll ticketing system comprising a trunk circuit, a register connected to said trunk circuit for storing data pertaining to a call extended through said trunk circuit, a clock and calendar circuit for providing a continuous indication of date and time, a first sender connected to and controlled by said clock and calendar circuit for sending digit representing signals to said register representing date and time, means in said trunk circuit for initiating operation of said first sender, a second sender for sending arbitrary digit representing signals of a fixed value in place of the signals representing date and time, means responsive to an abnormal operating condition in said first sender and controlled by said trunk circuit for rendering said second sender effective to supply signals to said register, and means included in said second sender for varying the fixed digital value of one of said arbitrary signals.

14. The system set forth in claim 13 in which said second sender includes counting means for controlling the number of signals supplied by said second sender, and switching means for conditioning said counting means to permit different selected numbers of signals to be supplied to said register by said second sender.

15. An automatic toll ticketing system comprising a plurality of circuit extending means each having an individual designation, switching means for seizing one of said circuit extending means incident to the extension of a connection, register means connected to said one extending means, first digit sending means common to said plurality of circuit extending means, and control means operated following the seizure of said one circuit extending means for operating said common digit sending means to send signals representing the individual designation of said one circuit extending means to said register means.

16. The system set forth in claim 15 including a second sending means, and means responsive to an abnormal operating condition in said first digit sending means for rendering said first sending means ineffective and for rendering said second sending means effective to send arbitrary signals to said register means in place of signals representing the designation of said one circuit extending means.

17. An automatic toll ticketing system comprising a plurality of circuit extending means each having an individual designation, switching means for seizing one of said circuit extending means, register means connected to said one circuit extending means, signal generating means, a plurality of digit representing conductors connected between said signal generating means and said one circuit extending means, and means operated incident to the extension of a connection to said one circuit extending means by said switching means for operating said signal generating means to supply signals over said conductors to said register means representing the individual designation of said one circuit extending means.

18. An automatic toll ticketing system comprising a plurality of circuit extending means each having an individual designation, switching means for seizing one of said circuit extending means, register means connected to said one circuit extending means, signal generating means, a plurality of digit representing conductors selectively connected between said signal generating means and said plurality of circuit extending means in accordance with the designations individual thereto, means in said one circuit extending means operable to render said register means responsive to signals applied to said conductors, and means operated following the seizure of said one circuit extending means by said switching means for initiating operation of said signal generating means to supply signals to said conductors, thereby to operate said register means to store the individual designation of said one circuit extending means.

19. An automatic toll ticketing system comprising a plurality of circuit extending means each having an individual designation, switching means for seizing a group of said circuit extending means incident to extending a group of separate connections, a group of register means each connected to one of said seized circuit extending means, and signaling means common to said plurality of circuit extending means for concurrently sending different signals to each of said group of register means representing the individual designations of said seized circuit extending means.

20. The system set forth in claim 19 including auxiliary signaling means common to said plurality of circuit extending means, and means responsive to an abnormal operating condition in said signaling means for operating said auxiliary signaling means to supply signals representing identical designations to the register means connected to all of said group of seized circuit extending means.

21. An automatic toll ticketing system comprising a plurality of circuit extending means each having an individual designation, switching means for seizing a group of said circuit extending means incident to extending a plurality of separate connections, register means connected to each of said seized circuit extending means, signal generating means common to said plurality of circuit extending means, a plurality of digit representing conductors connected between said signal generating means and said plurality of circuit extending means in accordance with the individual designations thereof, means in each of said seized circuit extending means for rendering the connected register means responsive to signals applied to said conductors, and means operated incident to the seizure of said circuit extending means for initiating operation of said signal generating means to apply signals to said conductors, whereby the different designations of the seized circuit extending means are stored in the registers connected thereto.

22. An automatic toll ticketing system including a control circuit for use in extending a communication path and having an individual designation, the combination comprising a register, a plurality of digit representing conductors, a pulse source for applying time spaced signals to said conductors, means for rendering a selected one of said conductors effective to supply signals to said register in accordance with a digit of the designation of said control circuit, and means operated in synchronism with said pulse source for sequentially preventing the application of signals to said conductors.

23. In an automatic toll ticketing system including a plurality of control circuits each having an individual digital designation, a plurality of registers, a plurality of conductors each representing a different digit, a pulse source for applying signals to said conductors, means controlled by the seizure of said control circuits for rendering different ones of said conductors effective to supply signals to said registers in accordance with the designations of the seized control circuits, and means operated in synchronism with said pulse source for sequentially preventing the application of signals to said conductors.

24. A digit sender comprising a plurality of groups of conductors, each of said groups including conductors representing the digits in a different denominational order, a pulse source, steering means for rendering said source effective to supply successive signals to the conductors in said groups in a fixed sequence whereby said source is effective to supply signals to only one of said groups at a time, and means cyclically operable during the application of signals to each of said groups and in synchronism therewith for preventing the application of signals to successive ones of the conductors in said groups.

25. The sender set forth in claim 24 including means controlled by said steering means for transmitting a control signal as each of said groups is rendered effective to receive signals from said pulse source.

26. In a digit sending circuit, a digit repeating relay, a plurality of conductors each representing a different digit, a means controlled in accordance with the value of a digit to be repeated for rendering a selected one of said conductors effective to control said relay, a pulse source for applying successive signals in common to all of said conductors, and means operated in synchronism with said pulse source for rendering successive ones of said conductors ineffective to receive signals from said pulse source.

27. An automatic toll ticketing system comprising a circuit extending means having an individual designation, register means connected to said circuit extending means, a clock and calendar circuit for providing a continuous indication of instant date and time, signal sending means controlled in part by said clock and calendar circuit, and means operated following the seizure of said circuit extending means for operating said signal sending means to supply signals representing instant date and time and signals representing said individual designation to said register.

28. An automatic toll ticketing system comprising a plurality of trunk circuits each having an individual designation, switching means for seizing one of said trunk circuits during the extension of a connection, register means connected to the seized trunk circuit, a clock and calendar circuit for providing a continuous indication of date and time, signaling means common to said trunk circuits and connected to said clock and calendar circuit, and means responsive to the seizure of said one trunk circuit for operating said signaling means to supply signals to said register means representing date and time and the individual designation of said one trunk circuit.

29. An automatic toll ticketing system comprising a plurality of circuit extending means each having an individual designation, switching means for seizing a group of said circuit extending means to extend separate connections therethrough, a group of register means each controlled by one of said seized circuit extending means, a clock and calender circuit for providing a continuous indication of instant date and time, sending means connected to said plurality of circuit extending means and controlled at least in part by said clock and calendar circuit, and means operative following the seizure of said circuit extending means for operating said signaling means to supply identical signals to all of said group of registers representing instant date and time and to supply different signals to each of said register means representing the individual designations of the seized circuit extending means.

References Cited in the file of this patent

UNITED STATES PATENTS

| | | |
|---|---|---|
| 2,594,495 | Retallack | Apr. 29, 1952 |
| 2,595,106 | Scudder | Apr. 29, 1952 |
| 2,767,246 | Retallack | Oct. 16, 1956 |
| 2,782,257 | Blashfield et al. | Feb. 19, 1957 |
| 2,848,543 | Breed et al. | Aug. 19, 1958 |
| 2,947,817 | Harris | Aug. 2, 1960 |